US010180553B2

(12) United States Patent
Flores et al.

(10) Patent No.: US 10,180,553 B2
(45) Date of Patent: Jan. 15, 2019

(54) TERMINAL ASSEMBLIES, END CAP ASSEMBLIES, AND FIBER OPTIC ENCLOSURES INCORPORATING THE SAME

(71) Applicant: CORNING RESEARCH & DEVELOPMENT CORPORATION, Corning, NY (US)

(72) Inventors: Julian Bautista Flores, Reynosa (MX); Joshua David Henley, Keller, TX (US); Jose Martinez Sanchez, Reynosa (MX); Karyne Poissant Prevratil, Fort Worth, TX (US); David Kimondo Waruiru, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/490,319

(22) Filed: Apr. 18, 2017

(65) Prior Publication Data
US 2018/0239099 A1 Aug. 23, 2018

Related U.S. Application Data

(60) Provisional application No. 62/460,277, filed on Feb. 17, 2017.

(51) Int. Cl.
*G02B 6/00* (2006.01)
*G02B 6/44* (2006.01)
*G02B 6/38* (2006.01)

(52) U.S. Cl.
CPC ......... *G02B 6/4442* (2013.01); *G02B 6/3887* (2013.01); *G02B 6/3897* (2013.01); *G02B 6/4471* (2013.01); *G02B 6/4479* (2013.01)

(58) Field of Classification Search
CPC .. G02B 6/4442; G02B 6/3897; G02B 6/3887; G02B 6/4471; G02B 6/4479
(Continued)

(56) References Cited

U.S. PATENT DOCUMENTS

| | | |
|---|---|---|
| 4,963,698 A | 10/1990 | Chang et al. |
| 5,426,715 A | 6/1995 | Moisson et al. |

(Continued)

FOREIGN PATENT DOCUMENTS

| | | |
|---|---|---|
| DE | 202010002192 U1 | 2/2010 |
| EP | 1736807 A1 | 12/2006 |

(Continued)

*Primary Examiner* — Thomas A Hollweg
*Assistant Examiner* — Guy Anderson
(74) *Attorney, Agent, or Firm* — Robert L. Branham

(57) ABSTRACT

Fiber optic enclosures, terminal assemblies, end cap assemblies, and methods of sealing fiber optic enclosures are disclosed. The terminal assembly of a fiber optic enclosure may include an input fiber sealing assembly and an output fiber sealing assembly. The input fiber sealing assembly may include an input fiber insert positioned in an input fiber channel of the cap body, an input fiber compression plate positioned in the input fiber channel, and an input fiber compression member for compressing the insert between the fiber compression plate and the base plate. The output fiber sealing assembly may include an output fiber insert positioned in the output fiber channel of the cap body, an output fiber compression plate positioned in the output fiber channel, and an output fiber compression member for compressing the insert between the fiber compression plate and the base plate.

23 Claims, 29 Drawing Sheets

(58) Field of Classification Search
USPC .................................................. 385/134–135
See application file for complete search history.

(56) References Cited

U.S. PATENT DOCUMENTS

| | | | |
|---|---|---|---|
| 5,732,180 A | 3/1998 | Kaplan | |
| 5,734,776 A * | 3/1998 | Puetz | G02B 6/4442 385/134 |
| 5,775,702 A | 7/1998 | Laeremans et al. | |
| 5,832,166 A | 11/1998 | Zimmer et al. | |
| 5,835,658 A | 11/1998 | Smith | |
| 6,248,953 B1 | 6/2001 | Miller | |
| 6,292,614 B1 | 9/2001 | Smith et al. | |
| 6,411,767 B1 | 6/2002 | Burrous et al. | |
| 6,575,474 B1 | 6/2003 | Zimmer et al. | |
| 6,778,752 B2 * | 8/2004 | Laporte | G02B 6/4442 385/135 |
| 6,802,512 B2 | 10/2004 | Muller et al. | |
| 7,015,394 B2 | 3/2006 | Desard et al. | |
| 7,093,985 B2 * | 8/2006 | Lord | G02B 6/4201 385/88 |
| 7,260,301 B2 * | 8/2007 | Barth | G02B 6/4442 385/134 |
| 7,583,885 B2 * | 9/2009 | Kowalczyk | G02B 6/444 385/134 |
| 7,650,055 B2 | 1/2010 | Cox et al. | |
| 7,702,208 B2 * | 4/2010 | Mudd | G02B 6/4442 385/135 |
| 7,737,361 B2 | 6/2010 | Huspeni et al. | |
| 7,936,962 B2 * | 5/2011 | Mudd | G02B 6/4442 385/135 |
| 8,050,528 B2 * | 11/2011 | Shimirak | H02G 15/013 174/77 R |
| 8,207,445 B2 | 6/2012 | Knorr et al. | |
| 8,498,510 B2 * | 7/2013 | Bran De Leon | G02B 6/4445 385/135 |
| 8,604,360 B2 | 12/2013 | Knorr et al. | |
| 8,687,934 B2 * | 4/2014 | Wright | G02B 6/4442 385/135 |
| 8,735,744 B2 | 5/2014 | Schwartz | |
| 8,873,926 B2 * | 10/2014 | Beamon | G02B 6/4248 385/134 |
| 9,494,765 B2 * | 11/2016 | Wright | G02B 6/4442 |
| 2005/0207711 A1 * | 9/2005 | Vo | G02B 6/4444 385/94 |
| 2010/0195970 A1 * | 8/2010 | Mudd | G02B 6/4442 385/135 |
| 2011/0181158 A1 * | 7/2011 | Bran De Leon | G02B 6/4445 312/107 |
| 2012/0243845 A1 * | 9/2012 | Wright | G02B 6/4442 385/135 |
| 2012/0298415 A1 | 11/2012 | Schwartz | |
| 2013/0101262 A1 * | 4/2013 | Wei | G02B 6/4442 385/135 |
| 2013/0287360 A1 * | 10/2013 | Beamon | G02B 6/4248 385/136 |
| 2014/0150237 A1 * | 6/2014 | Wright | G02B 6/4442 29/428 |
| 2015/0137461 A1 * | 5/2015 | Coenegracht | G02B 6/4444 277/618 |
| 2015/0168663 A1 * | 6/2015 | Aznag | G02B 6/4444 385/135 |
| 2015/0204717 A1 * | 7/2015 | Saeedkia | H04B 10/80 250/227.11 |

FOREIGN PATENT DOCUMENTS

| | | |
|---|---|---|
| EP | 1736808 A2 | 12/2006 |
| EP | 1744191 A1 | 1/2007 |
| EP | 1656720 B1 | 5/2007 |
| EP | 1736807 B1 | 7/2010 |
| EP | 1744191 B1 | 7/2010 |
| EP | 1970737 B1 | 10/2012 |
| WO | 1996029760 A1 | 9/1996 |
| WO | 2005020400 A1 | 3/2005 |
| WO | 2007118549 A1 | 10/2007 |

* cited by examiner

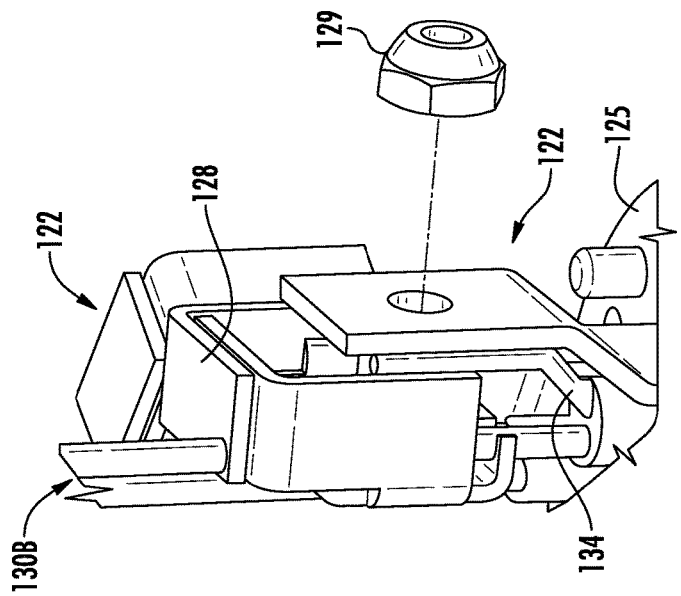
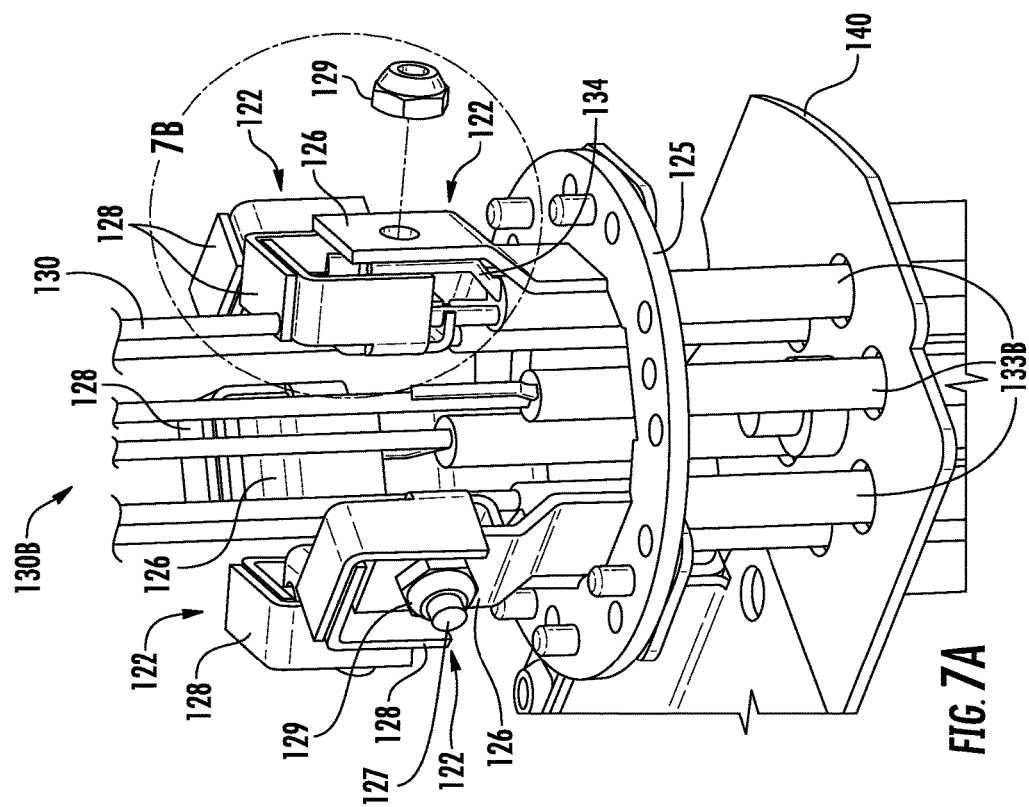

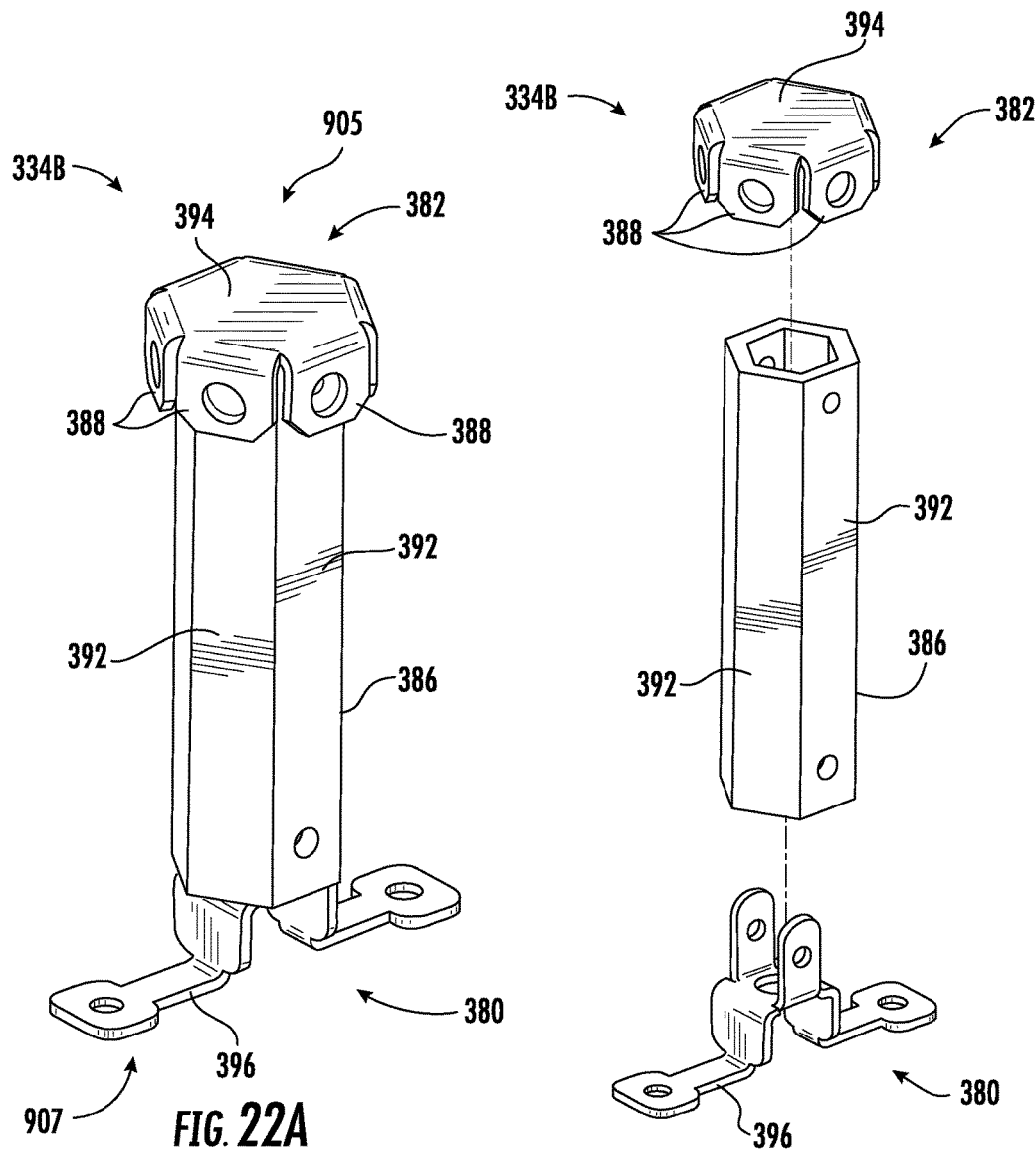
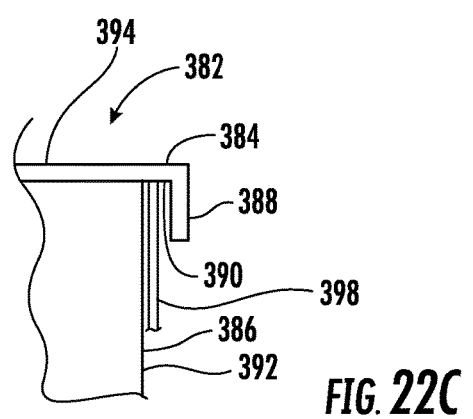
FIG. 22A FIG. 22B FIG. 22C

TERMINAL ASSEMBLIES, END CAP ASSEMBLIES, AND FIBER OPTIC ENCLOSURES INCORPORATING THE SAME

CROSS-REFERENCE TO RELATED APPLICATIONS

This application claims the benefit of priority to U.S. Provisional Application No. 62/460,277, filed on Feb. 17, 2017, and is incorporated herein by reference.

BACKGROUND

Field

The present disclosure generally relates to fiber optic enclosures and, more particularly, to terminal assemblies, end cap assemblies and fiber optic enclosures that are sealed from the environment and provide strain relief for optical cables.

Technical Background

Benefits of optical fiber include extremely wide bandwidth and low noise operation. Because of these advantages, optical fiber is increasingly being used for a variety of applications, including, but not limited to, broadband voice, video, and data transmission. Fiber optic networks are being deployed to provide high speed optical data transmission to consumers, such as personal and commercial customers.

Fiber optic splitter modules may be utilized to split an input optical fiber signal into two or more optical fibers signals to send optical signals propagating in the input optical fiber to multiple locations, such as dwellings and commercial buildings. Fiber optic splitter modules may be positioned at various locations of the fiber optic network, such as underground within a pit, within a cabinet, or above ground on a telephone pole or the like. In these situations, the fiber optic splitter modules are disposed within a fiber optic enclosure for protection from the environment. To prevent water, humidity, debris, and the like from entering the fiber optic enclosure, the fiber optic enclosure should be sealed. In some cases, the fiber optic enclosure includes an end cap having the optical splitter modules attached thereto. The end cap is then inserted into a housing with a sealed engagement. As input optical fibers enter the fiber optic enclosure and output optical fibers exit the fiber optic enclosure, a seal must also be provided about the input and output optical fibers.

The seals around the input and output optical fibers are commonly provided by the application of heat shrink tubing around the input and output optical fibers at the entry and exit points of the input and output optical fibers, respectively. However, the application of heat shrink tubing takes time and requires additional equipment, such as a heat source. In addition, heat shrink seals are typically not removable and, thus, it is difficult to repair or make changes to the input and output optical fibers once they have been sealed in heat shrink tubing.

In addition to providing adequate seals for the input and output optical fibers, the fiber optic enclosure should also strain relieve the input and output optical cables maintaining the input and output optical fibers to prevent damage to the input and output optical fibers or internal components of the enclosure (e.g., splice modules, splitter modules, etc.) when force is applied thereto. Traditionally, strain relief has been provided by attaching a strength member of the input and output optical cables to the frame upon which the optical splitter modules are mounted. However, this method of strain relief requires the components within the housing of the fiber optic enclosure to be fully assembled, or almost fully assembled, before strain relieving the input and output optical cables. The additional components attached to the frame may make it difficult for a craftsman to access the strain relief points on the frame and properly attached the strength members to the strain relief points.

Accordingly, alternative terminal assemblies, end caps, and fiber optic enclosures having simpler sealing and strain relief capabilities are desired.

SUMMARY

In one embodiment, an end cap assembly for a fiber optic enclosure includes a cap body and a terminal assembly. The cap body includes a first side and a second side, an input fiber channel extending from the first side to the second side, and an output fiber channel extending from the first side to the second side. The terminal assembly includes an input fiber sealing assembly and an output fiber sealing assembly. The input fiber sealing assembly includes an input fiber plate coupled to the first side of the cap body, an input fiber gel insert positioned adjacent the input fiber plate, wherein the input fiber gel insert is disposable within the input fiber channel of the cap body, an input fiber compression plate, wherein the input fiber gel insert is disposable between the input fiber compression plate and the input fiber plate, and an input fiber compression member. The input fiber compression member passes through the input fiber plate, the input fiber gel insert, and the input fiber compression plate. The input fiber sealing assembly further includes an input fiber strain relief member having a freestanding end. The output fiber sealing assembly includes an output fiber plate coupled to the first side of the cap body, an output fiber gel insert positioned adjacent the output fiber plate, wherein the output fiber gel insert is disposable within the output fiber channel of the cap body, an output fiber compression plate, wherein the output fiber gel insert is disposed between the output fiber compression plate and the output fiber plate, and an output fiber compression member. The output fiber compression member passes through the output fiber plate, the output fiber gel insert and the output fiber compression plate. The output fiber sealing assembly further includes an output fiber strain relief member comprising a first end coupled to the output fiber plate and a freestanding second end.

In another embodiment, a terminal assembly for a fiber optical enclosure includes an input fiber termination assembly and an output fiber termination assembly. The input fiber termination assembly includes an input fiber plate, and an input fiber strain relief member having a freestanding end. The input fiber strain relief member includes an input fiber strain relief bracket coupled to, and extending from, the input fiber plate, and an input fiber central member at the freestanding end of the input fiber strain relief member operable to clamp a strength member of an input optical cable between the input fiber central member and the input fiber strain relief bracket. The output fiber termination assembly includes an output fiber plate comprising a plurality of output fiber openings and an output fiber strain relief assembly. The output fiber strain relief assembly includes a frame portion, a bracket extending from the frame portion and coupled to the output fiber plate such that the frame portion is aligned with the plurality of output fiber openings, and a plurality of output fiber strain relief members extending from the frame portion. Each individual output fiber strain relief member of the plurality of output fiber strain relief members includes an output fiber strain relief bracket and an output fiber central member at a freestanding end of the input fiber strain relief member operable to clamp a strength member of an output optical cable between the output fiber central member and the output fiber strain relief bracket.

In yet another embodiment, a fiber optic enclosure includes a cap body and a terminal assembly. The cap body includes a first side and a second side, an input fiber channel extending from the first side to the second side, and an output fiber channel extending from the first side to the second side. The terminal assembly includes an input fiber sealing assembly and an output fiber sealing assembly. The input fiber sealing assembly includes an input fiber plate coupled to the first side of the cap body, an input fiber gel insert positioned adjacent to the input fiber plate, wherein the input fiber gel insert is disposable within the input fiber channel of the cap body, an input fiber compression plate, wherein the input fiber gel insert is disposed between the input fiber compression plate and the input fiber plate, and an input fiber compression member that passes through the input fiber plate, the input fiber gel insert and the input fiber compression plate. The input fiber sealing assembly further includes an input fiber strain relief member having a freestanding end. The output fiber sealing assembly includes an output fiber plate coupled to the first side of the cap body, an output fiber gel insert positioned adjacent to the output fiber plate, wherein the output fiber gel insert is disposable within the output fiber channel of the cap body, an output fiber compression plate, wherein the output fiber gel insert is disposed between the output fiber compression plate and the output fiber plate, and an output fiber compression member that passes through the output fiber plate, the output fiber gel insert and the output fiber compression plate. The output fiber sealing assembly further includes an output fiber strain relief member comprising a first end coupled to the output fiber plate and a freestanding second end. The fiber optic enclosure further includes a frame member coupled to the cap body, a splitter module coupled to the frame member, and a housing coupled to the cap body such that the terminal assembly, the frame member and the splitter module are enclosed by the housing and the cap body.

In yet another embodiment, a method of terminating and sealing an optical cable in a cap body of a fiber optic enclosure includes positioning the optical cable through an opening of a compression plate member, a fiber gel insert and a fiber plate. The fiber gel insert is disposed between the compression plate member and the fiber plate. A compression member is disposed within the fiber gel insert. The fiber plate is coupled to a surface of the cap body. The fiber gel insert and the fiber plate are disposed within an opening of the cap body. The method further includes compressing the fiber gel insert using the compression member such that a seal is formed about the optical cable, and positioning a strength member of the optical cable between a central member and a freestanding end of a strain relief bracket, wherein the strain relief bracket is coupled to the fiber plate. The method further includes clamping the strength member between the central member and the freestanding end of the strain relief bracket.

In yet another embodiment, an end cap assembly for a fiber optic enclosure includes a cap body, a base, an input fiber sealing assembly and an output fiber sealing assembly. The base plate is coupled to the cap body. The input fiber sealing assembly includes an input fiber insert positioned in the input fiber channel of the cap body, and an input fiber compression plate positioned in the input fiber channel of the cap body. The input fiber insert is disposed between the input fiber compression plate and the base plate. The input fiber sealing assembly also includes an input fiber compression member, wherein the input fiber compression member passes through the base plate, the input fiber gel insert and the input fiber compression plate. The output fiber sealing assembly includes an output fiber insert positioned in the output fiber channel of the cap body, and an output fiber compression plate positioned in the output fiber channel of the cap body. The output fiber insert is disposed between the output fiber compression plate and the output fiber plate. The output fiber sealing assembly also include an output fiber compression member, wherein the output fiber compression member passes through the base plate, the output fiber insert, and the output fiber compression plate. The output fiber sealing assembly also includes an output fiber strain relief member comprising a first end coupled to the base plate and a freestanding second end.

In another embodiment, a fiber optic enclosure includes a cap body and a terminal assembly that includes a base plate, an input fiber sealing assembly and an output fiber sealing assembly. The cap body includes a first side and a second side, an input fiber channel extending from the first side to the second side, and an output fiber channel extending from the first side to the second side. The base plate of the terminal assembly is coupled to the first side of the cap body. The input fiber sealing assembly includes an input fiber insert positioned in the input fiber channel of the cap body; an input fiber compression plate positioned in the input fiber channel of the cap body, the input fiber insert located between the input fiber compression plate and the base plate; an input fiber compression member, wherein the input fiber compression member passes through the base plate, the input fiber insert, and the input fiber compression plate; and an input fiber strain relief member having a first end coupled to the base plate and a freestanding second end. The output fiber sealing assembly includes an output fiber insert positioned in the output fiber channel of the cap body; an output fiber compression plate positioned in the output fiber channel of the cap body, the output fiber insert located between the base plate and the output fiber plate; an output fiber compression member, wherein the output fiber compression member passes through the base plate, the output fiber gel insert, and the output fiber compression plate; and an output fiber strain relief member comprising a first end coupled to the base plate and a freestanding second end. The fiber optic enclosure also includes a frame member coupled to the cap body; and a housing coupled to the cap body, the housing and the cap body defining an internal volume, the terminal assembly and the frame member in the internal volume.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

FIG. 7A illustrates a close-up, perspective view of an example output fiber strain relief assembly of the terminal assembly depicted in FIGS. 2A and 2B according to one or more embodiments described and illustrated herein;

FIG. 7B illustrates a close-up, perspective view of an example output fiber strain relief member of the output fiber strain relief assembly depicted in FIG. 7A according to one or more embodiments described and illustrated herein;

FIG. 22A illustrates a close-up, perspective view of an example output fiber strain relief assembly of the terminal assembly depicted in FIGS. 14 and 15 according to one or more embodiments described and illustrated herein;

FIG. 22B illustrates an exploded view of the example output fiber strain relief assembly of FIG. 22A according to one or more embodiments described and illustrated herein;

FIG. 22C illustrates close-up view of a portion of the example output fiber strain relief assembly of FIG. 22A.

DETAILED DESCRIPTION

Embodiments are directed to fiber optic enclosures comprising fiber optic components, such as splitter modules, for example. More particularly, embodiments are directed to terminal assemblies, end cap assemblies, and fiber optic enclosures providing sealing and strain relief capabilities for optical cables. Various embodiments of terminal assemblies, end cap assemblies, and fiber optic enclosures are described in detail below.

Figure 1A:
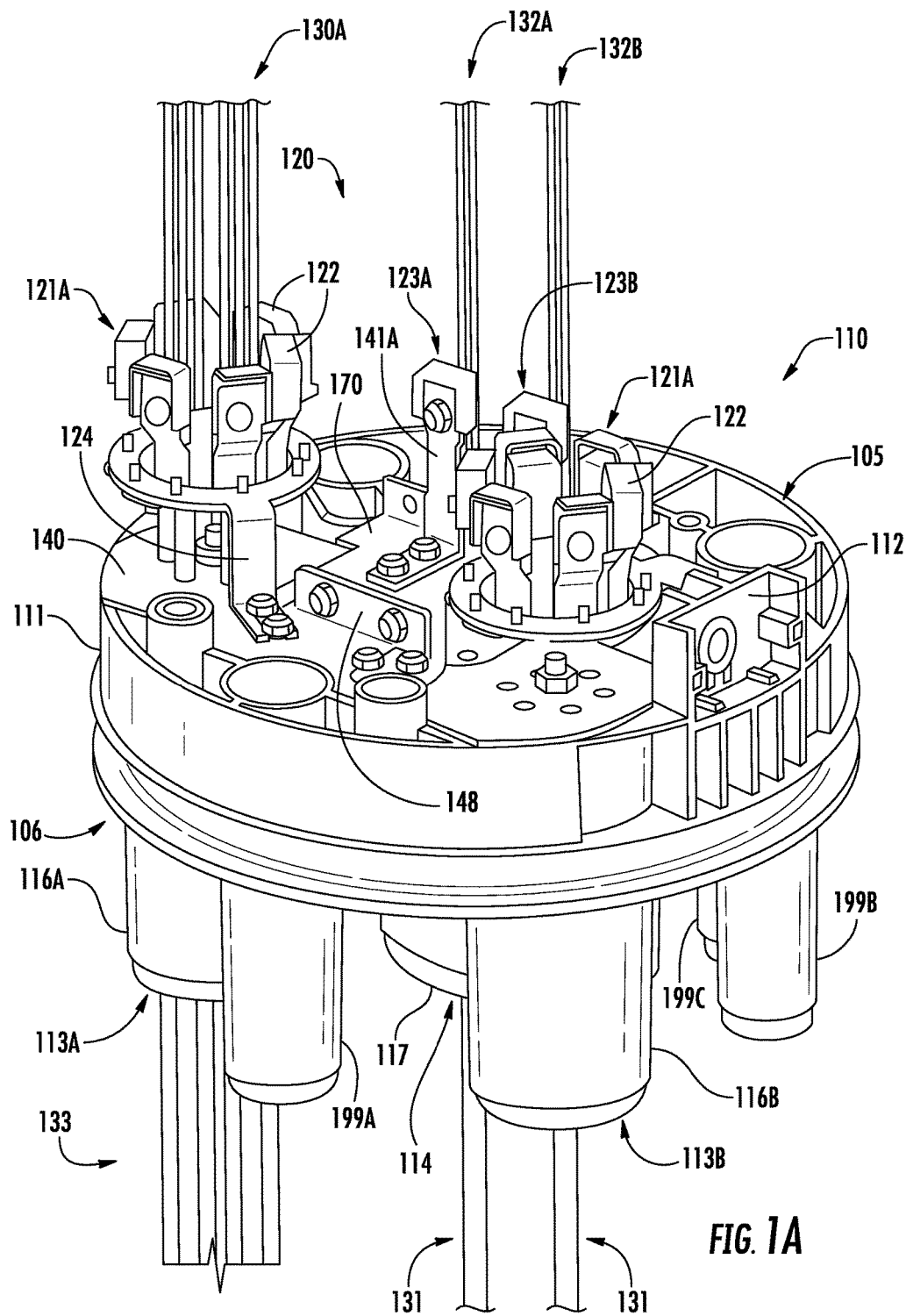
FIG. 1A illustrates a perspective view of an example end cap assembly comprising an example terminal assembly coupled to an example cap body according to one or more embodiments described and illustrated herein.
Figure 1B:
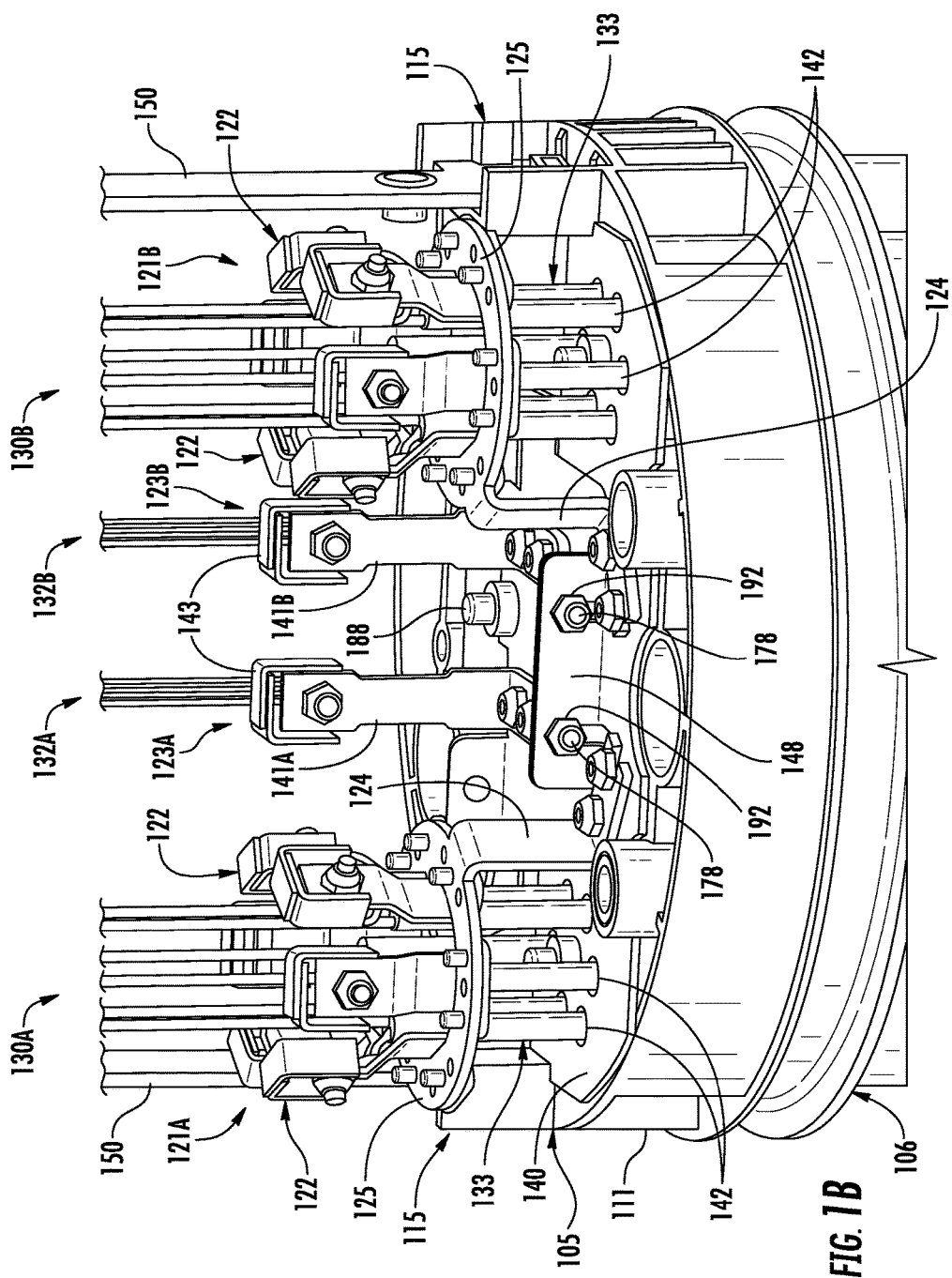
FIG. 1B illustrates a close-up, perspective view of the end cap assembly depicted in FIG. 1A according to one or more embodiments described and illustrated herein.

Referring now to FIGS. 1A and 1B, an example end cap assembly 110 for a fiber optic enclosure 100 (see, e.g., FIG.

Figure 11:
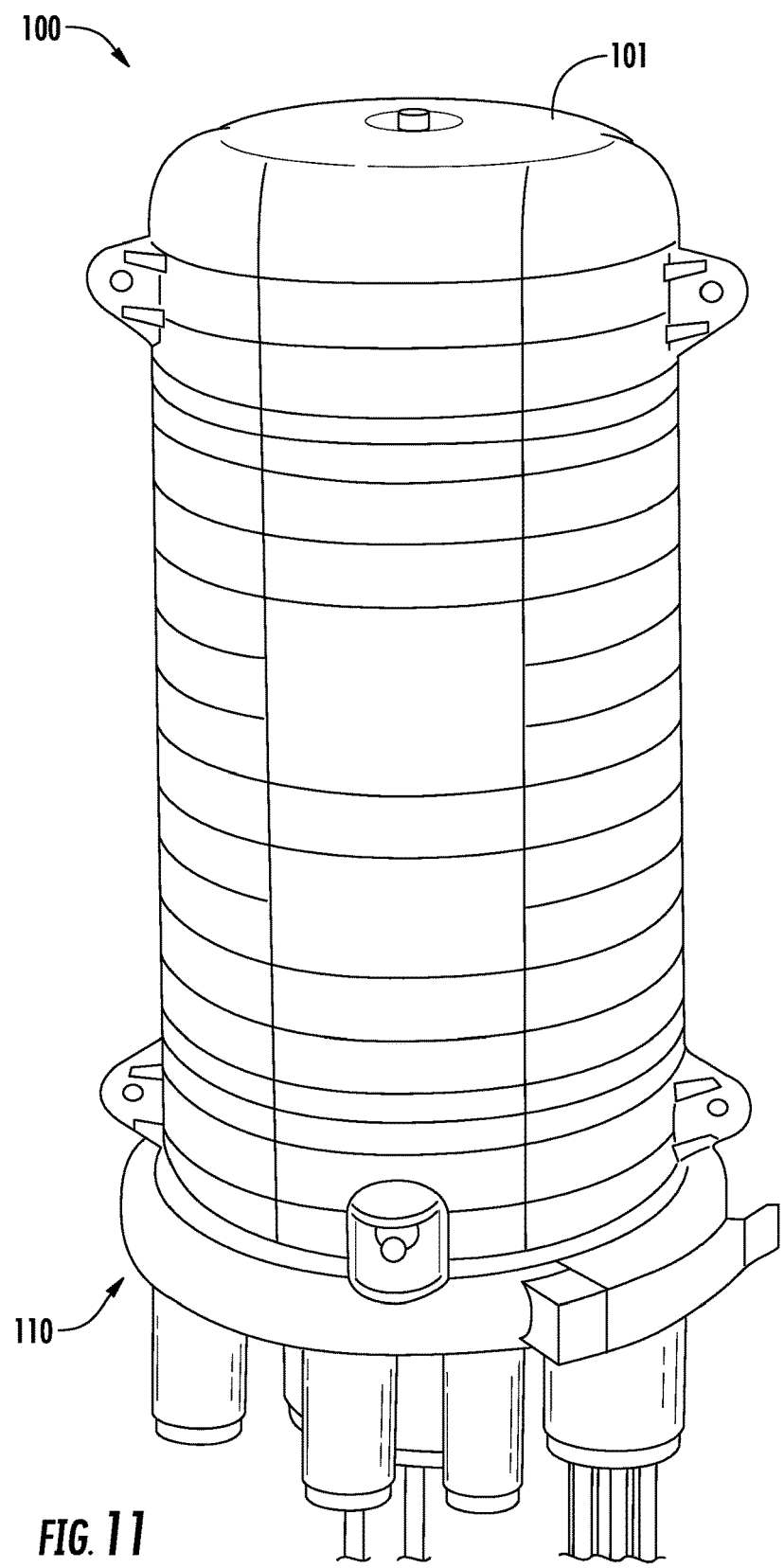
FIG. 11 illustrates an example fiber optic enclosure according to one or more embodiments described and illustrated herein.

11) is schematically illustrated. As described in detail below, the end cap assembly 110 both seals the fiber optic enclosure 100 about input optical cable 131 and output optical cables 133 as well as provides strain relief to the input optical cable 131 and the output optical cables 133. As shown in FIG. 11, the end cap assembly 110 is coupled to the housing 101 to enclose the components disposed therein.

Still referring to FIGS. 1A and 1B, the example end cap assembly 110 generally comprises a cap body 111 and a terminal assembly 120 disposed on a first side 105 of the cap body 111. Although the example cap body 111 is illustrated as being circular in shape, embodiments are not limited thereto. As non-limiting examples, the cap body 111 may be elliptical or rectangular in cross-section.

The example cap body 111 includes a plurality of protrusions extending from a second side 106 and defining channels for components of the terminal assembly 120. For example, first and second protrusions 116A, 116B provide first and second channels 113A, 113B, respectively for first and second plurality of output optical cables 133 to exit the fiber optic enclosure 100 (while the output optical cables 133 are only shown exiting the first protrusion 116A in FIG. 1A, the second protrusion 116B may also include a plurality of output optical cables 113A in some embodiments, for example, as partially illustrated in FIG. 1B). As such, the first and second channels 113A, 113B extend between the first side 105 and the second side 106 of the cap body 111. It should be understood that more or fewer protrusions and channels may be provided for more or fewer groups of output optical cables 133. The cap body 111 also includes a third protrusion 117 providing a channel 114 for an input optical cable 131. It should be understood that more or fewer input optical cables 131 may be provided. In other embodiments, the cap body 111 may not include protrusions on the second side 106 but rather on the first side 105. In yet other embodiments, the cap body 11 may not include protrusions but rather the channels for the input and output optical fibers may be disposed completely within the cap body 111.

As mentioned above, additional protrusions and openings may accommodate additional input/output fibers. For example, the cap body 111 includes additional protrusions 199A, 199B and 199C. These additional protrusions 199A, 199B and 199C may include openings that are sealed when not in use. In the embodiment illustrated in FIG. 1A, the additional protrusions 199A, 199B and 199C are not in use and, thus, are sealed. The terminal assemblies described herein may be used to seal the additional protrusions 199A, 199B and 199C, or the additional protrusion may be sealed using other sealing techniques, such as heat shrink sealing.

Figure 2A:
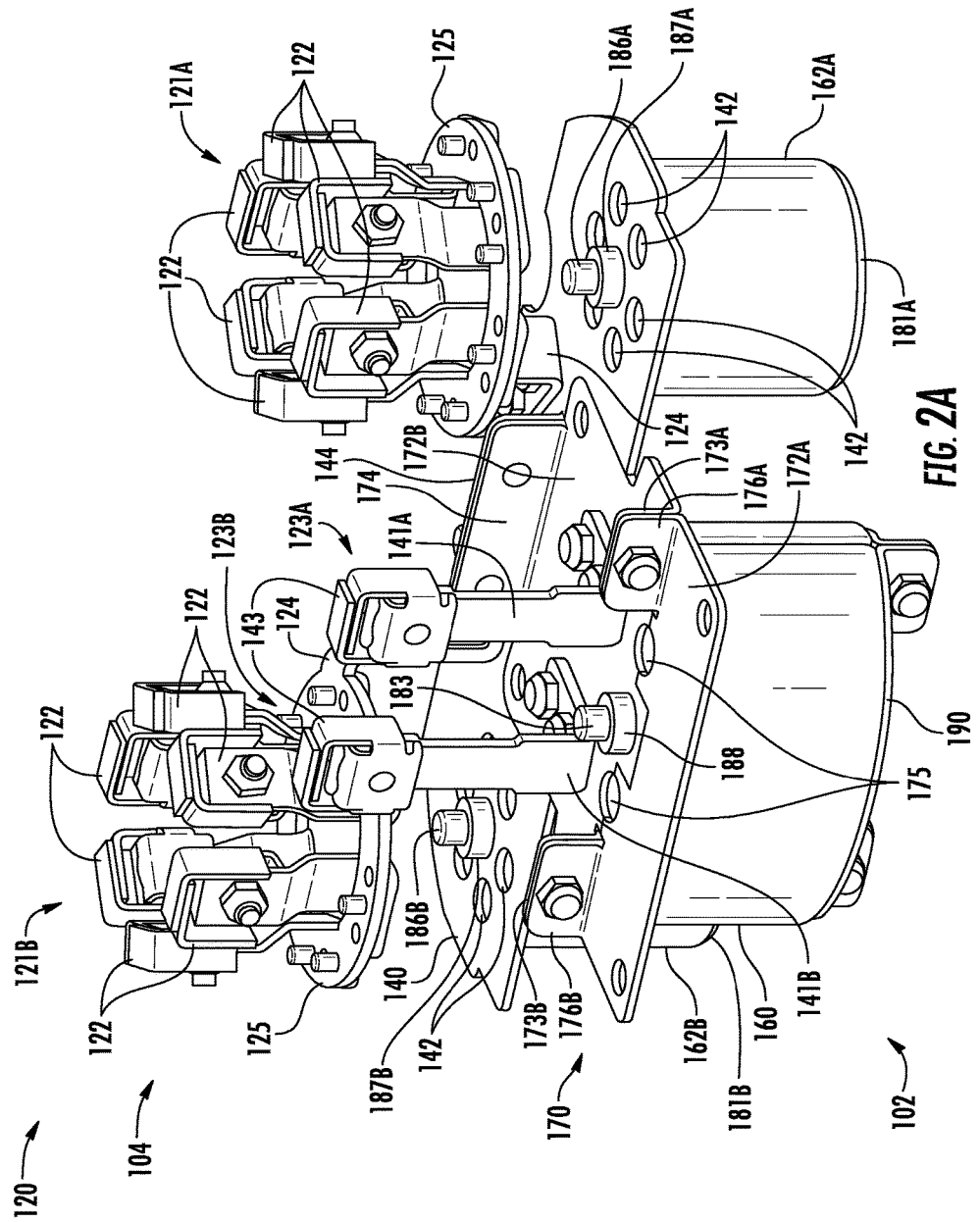
FIG. 2A illustrates a perspective view of the terminal assembly depicted in FIGS. 1A and 1B according to one or more embodiments described and illustrated herein.
Figure 2B:
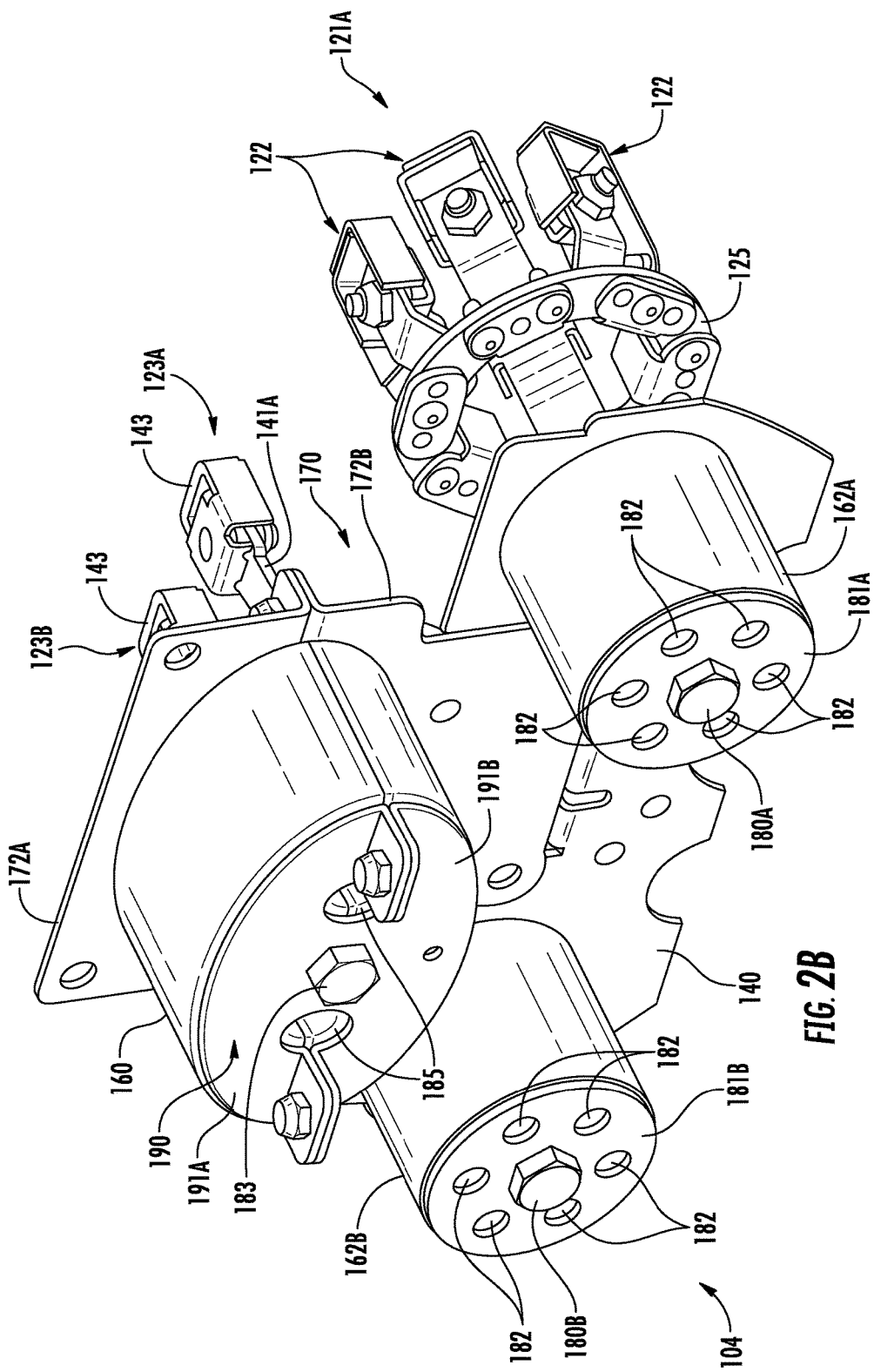
FIG. 2B illustrates a bottom perspective view of the terminal assembly depicted in FIG. 2A according to one or more embodiments described and illustrated herein.

Referring now to FIGS. 2A and 2B, an example terminal assembly 120 is schematically illustrated. The terminal assembly 120 is configured to seal the fiber optic enclosure 100 from the environment and provide strain relief to the input optical cables 131 (see FIG. 1A) and the output optical cables 133 (see FIGS. 1A and 1B). Generally, the example terminal assembly 120 includes an input fiber sealing assembly 102 and an output fiber sealing assembly 104.

As described in more detail below, the input fiber sealing assembly 102 is operable to seal the end cap assembly 110 about the input optical cable 131 (see FIG. 1A), as well as terminate the strength members of the input optical cable 131. Similarly, the output fiber sealing assemblies 104 seal the end cap assembly 110 about the plurality of output optical cables 133 (see FIGS. 1A and 1B) as well as terminate the strength members of the plurality of output optical cables 133.

The example input fiber sealing assembly 102 of FIGS. 2A and 2B comprises an input fiber plate 170, an input fiber gel insert 160 disposed between the input fiber plate 170 and an input fiber compression plate 190, and at least one input fiber strain relief member (e.g., first and second input fiber strain relief members 123A, 123B). In the illustrated embodiment, the input fiber plate 170 comprises a first input fiber plate 172A coupled to a second input fiber plate 172B. However, it should be understood that the input fiber plate 170 may be configured as a single, unitary component, or three or more plates or components.

Figure 3:
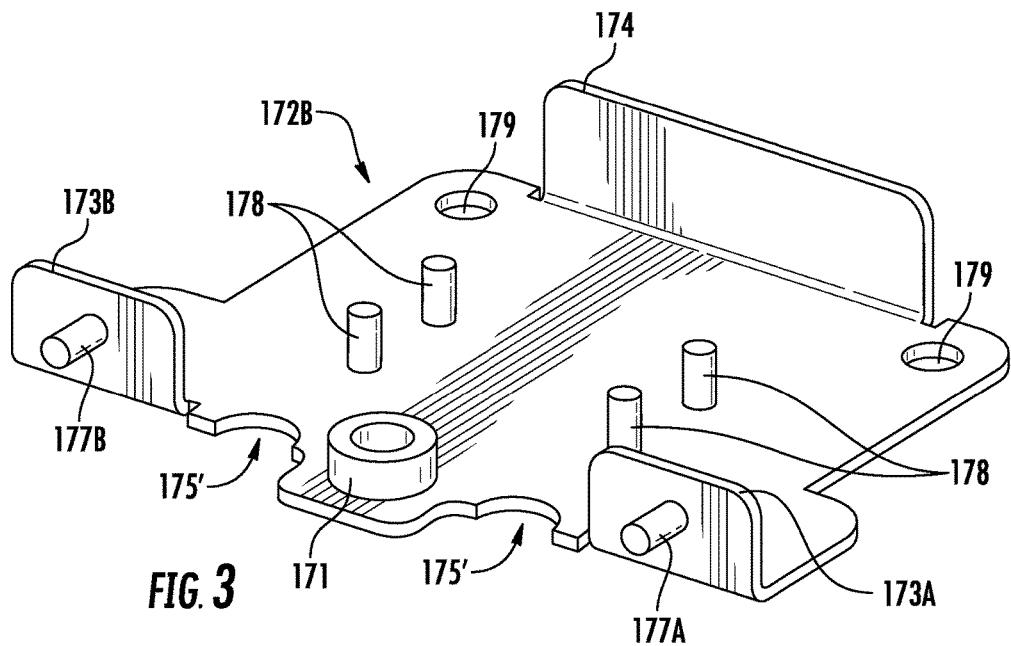
FIG. 3 illustrates an example second fiber input plate of the terminal assembly depicted in FIGS. 2A and 2B according to one or more embodiments described and illustrated herein.

Referring to FIG. 3, an example second input fiber plate 172B is schematically illustrated. The second input fiber plate 172B includes a first flange 174 that is provided for coupling to the output fiber plate 140, as described in more detail below. The second input fiber plate 172B also includes a plurality of openings 179 for coupling the second input fiber plate 172B to output fiber plate 140 and the first side 105 of the cap body 111, as well as a plurality of posts 178 for coupling first and second input fiber strain relief members 123A, 123B to the second input fiber plate 172B. As an example and not a limitation, the posts 178 may be threaded to receive nuts to couple the first and second input fiber strain relief members 123A, 123B to the second input fiber plate 172B. It should be understood that other fastening means may also be utilized.

The second input fiber plate 172B further includes notches 175' that cooperate with corresponding notches of the first input fiber plate 172A to define input optical cable openings 175 through which the input optical cable 131 passes. The second input fiber plate 172B also includes third and fourth flanges 173A, 173B having posts 177 for coupling the second input fiber plate 172B to the first input fiber plate 172A. Like posts 178, posts 177 may also be threaded to receive nuts or other fastener devices. An integral self clinching nut 171 is provided in the second input fiber plate 172B for receiving an input fiber compression member 188 (see FIG. 5) configured as a rod having a threaded end. The threaded end of the input fiber compression member 188 engages the internal threads of the self clinching nut 171. It should be understood that the input fiber compression member 188 may be coupled to the second input fiber plate 172B by means other than the self clinching nut 171.

Referring once again specifically to FIG. 2B, the input fiber compression plate 190 of the illustrated example comprises a first input fiber compression plate 191A coupled to a second input fiber compression plate 191B by corresponding flanges and fasteners (not numbered). The first and second input fiber compression plates 191A, 191B define openings 185 through which the input optical cables 131 (FIG. 1A) pass.

Figure 5:
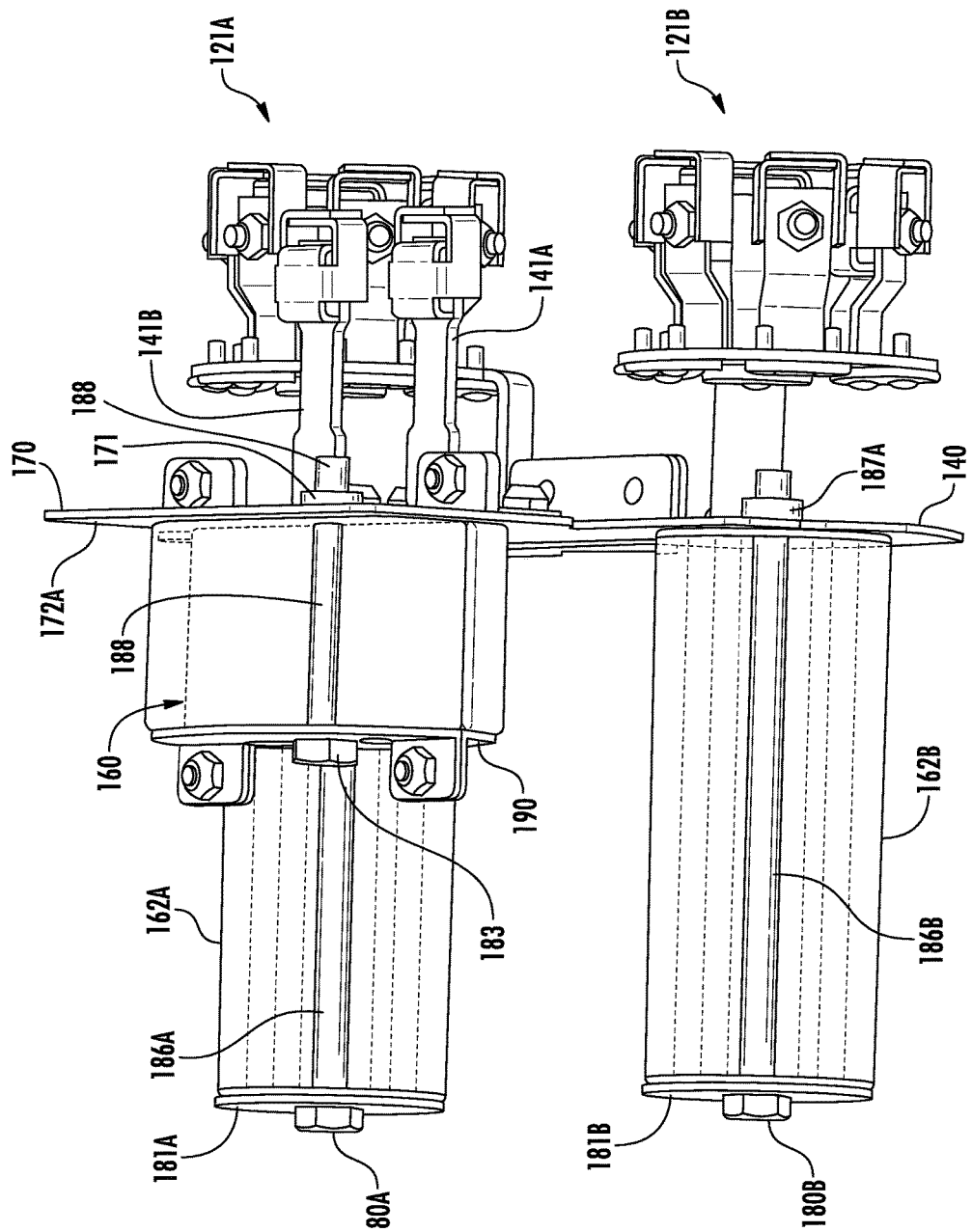
FIG. 5 illustrates a side perspective view of the terminal assembly depicted in FIGS. 2A and 2B according to one or more embodiments described and illustrated herein.

Referring briefly to FIG. 5, the input fiber gel insert 160 is disposed between the input fiber plate 170 and the input fiber compression plate 190. The input fiber gel insert 160 includes an opening (not numbered) for the input fiber compression member 188 and openings (not numbered) for the input optical cables 131 (FIG. 1A). The input fiber gel insert 160 may be any deformable material capable of deforming and providing a seal about the input optical cables 131 and sealing the channel 114 of the cap body 111. Example materials for the input fiber gel insert 160 include, but are not limited to, rubber, elastomers, silicone, and the like.

Referring still to FIG. 5, the example input fiber compression member 188 is configured as a rod having a bolthead 183 at the input fiber compression plate 190. The input fiber compression member 188 is positioned through the input fiber gel insert 160 such that the threaded end opposite from the bolthead 183 is engaged with the self clinching nut 171 of the second input fiber plate 172B. Rotation of the bolthead 183 causes the input fiber compression plate 190 to be drawn closer to the input fiber plate 170, thereby compressing input fiber gel insert 160. Compression of the input fiber gel insert 160 causes the input fiber gel insert 160 to expand in a direction orthogonal to an axis of the input fiber compression member 188, which further causes the input fiber gel insert 160 to close around the input optical cables 131. Expansion of the input fiber gel insert 160 in the direction orthogonal to the axis of the input fiber compression member 188 further causes the input fiber gel insert 160 to be pressed against the walls of the cap body 111 within channel 114. In this manner, the cap body 111 is sealed at the channel 114 and the input optical cables 131.

Referring once again to FIGS. 2A and 2B, the first and second input fiber strain relief members 123A, 123B are coupled to the second input fiber plate 172B. As described in more detail below, the first and second strain relief members 123A, 123B define an input fiber termination assembly that provides strain relief for the first and second input optical cables 131 by clamping the respective strength members contained therein.

Figure 23:
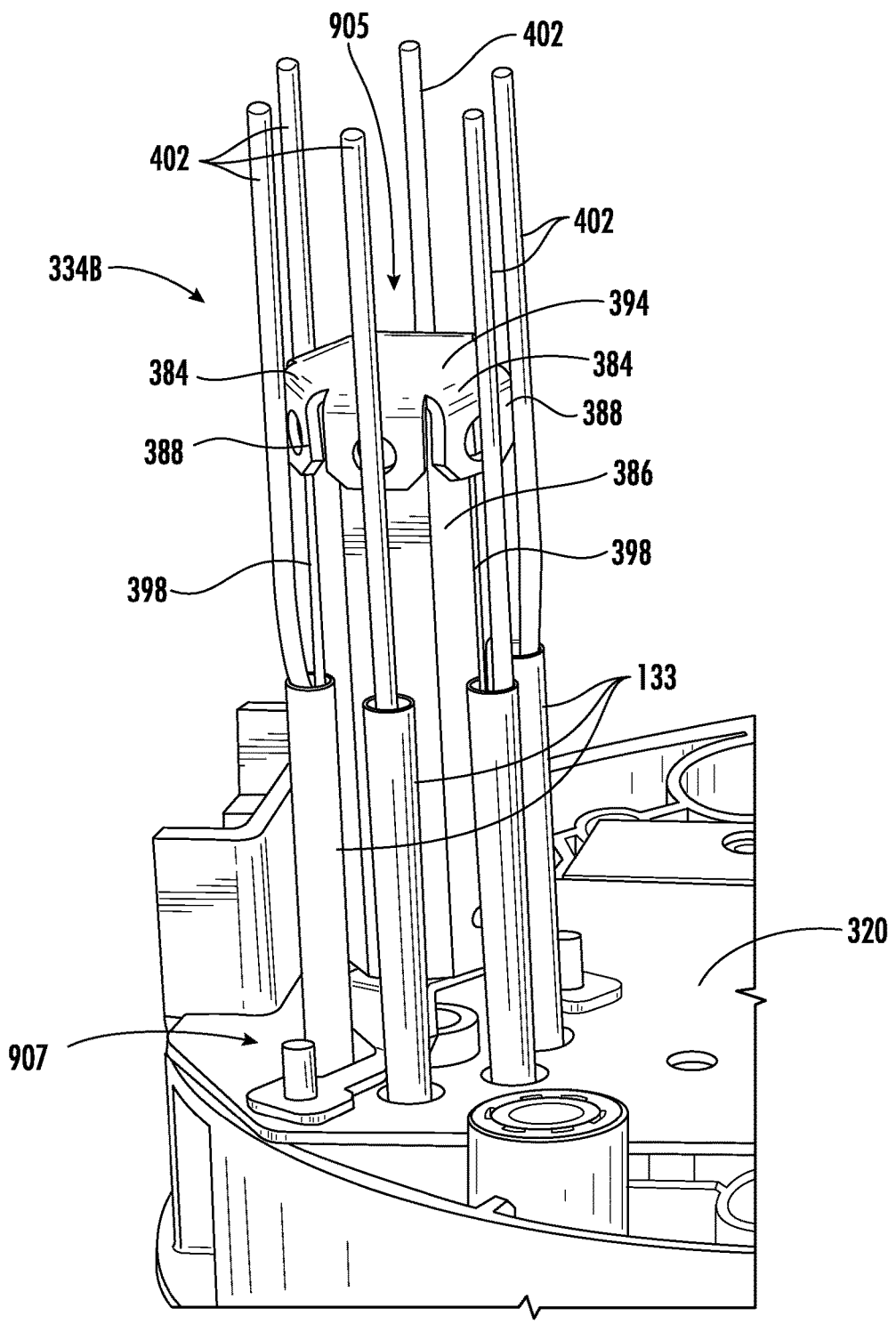
FIG. 23 illustrates a close-up, perspective view of the example output fiber strain relief assembly and a plurality of output optical cables according to one or more embodiments described and illustrated herein.

The example first and second input fiber strain relief members 123A, 123B each comprise an input fiber strain relief bracket 141A, 141B coupled to the input fiber plate 170 (e.g., the second input fiber plate 172B), and an input fiber central member 143 at a freestanding end of each input fiber strain relief member 123A, 123B. As used herein, a "freestanding end" of a component means that the end is not in contact with any other component except for a strength member of a cable or any other component of a cable. The component having a "freestanding end" may have other portions (e.g., other ends besides the "freestanding end") that are connected to or contact other components besides a strength member of a cable or any other component of a cable. For example, referring to FIG. 6, the central member 143 is located at a freestanding end 901 of the input fiber strain relief member 123. The central member 143 may couple to a strength member 149 of an input fiber optic cable 131 or some other portion of the cable 132, but the central member 143 is not connected to or contacting the input fiber plate 170, the cap body 111 (FIG. 1), the frame member 150 (FIG. 9), the housing 101 (FIG. 11), or any other component besides portions of the input fiber optic cable 131. The non-freestanding end 903 of the input fiber strain relief member 123 is coupled to the input fiber plate 170. In another example, referring momentarily to FIG. 14, the output fiber strain relief assemblies 334B include freestanding ends 905 and non-freestanding ends 907. Referring to FIG. 23, the freestanding ends 905 may contact the strength members 398 of one or more output fiber optic cables 133 (or some other portion of the output fiber optic cables 133) but do not contact the base plate 320, the cap body 302 (FIG. 12), the frame member 404 (FIG. 24), the housing 101 (FIG. 11), or any other component besides portions of the input fiber optic cable 133. The non-freestanding end 907 of the output fiber strain relief assemblies 334B is coupled to the base plate 320. The present disclosure of strain relief members 123, 122, 334A, and 334B that include freestanding ends greatly reduces the complexity of the fiber optic enclosure and may allow a technician to seal and strain relieve the input fiber optic cables and the output fiber optic cables in the end cap assembly without the need to first connect a frame or other components to the end cap assembly.

The input fiber strain relief bracket 141 of the illustrated example is configured as an "L" shaped bracket that is coupled to the second input fiber plate 172B. However, it should be understood that the input fiber strain relief bracket 141 may be configured as a shape other than an "L" shape. As shown in FIGS. 2A and 2B, the input fiber strain relief bracket 141 extends from the input fiber plate 170.

Referring now to FIGS. 1B, 2A and 2B, the example output fiber sealing assembly 104 generally includes an output fiber plate 140, a first output fiber gel insert 162A, a second output fiber gel insert 162B, a first output fiber strain relief assembly 121A, and a second output fiber strain relief assembly 121B. In the illustrated example, the output fiber sealing assembly 104 is configured to accept and seal two groups of output optical cables 133 (FIG. 1B). It should be understood that more or fewer groups of output optical cables may be accepted and sealed by the output fiber sealing assembly 104. As noted hereinabove, the output optical cables 133 include optical fibers that are split from the input optical fibers of the input optical cables 131. Accordingly, there are typically more output optical fibers exiting the fiber optic enclosure 100 than input optical fibers entering the fiber optic enclosure 100.

The output fiber plate 140 includes a plurality of output fiber openings 142 at two ends of the output fiber plate 140. In the illustrated example, each plurality of output fiber openings 142 defines a circle; however, it should be understood that embodiments are not limited to the circular configuration of the output fiber openings 142. The number of output fiber openings 142 of each plurality of output fiber openings 142 is not limited by this disclosure.

The example output fiber plate 140 further includes a self-clinching nuts 187A, 187B at the center of each plurality of output fiber openings 142. The self clinching nuts 187A, 187B receive output fiber compression members 186A, 186B, respectively, as described above with respect to the input fiber compression member 188.

Referring specifically to FIG. 2A, the illustrated output fiber plate 140 also includes a flange 144 that is coupled to the first flange 174 of the second input fiber plate 172B. For example, the first flange 174 may include threaded posts to which nuts are fastened. Other coupling means are also possible.

The first and second output fiber gel inserts 162A, 162B are disposed between the output fiber plate 140 and corresponding output fiber compression plates 181A, 181B, respectively. Each output fiber gel insert 162A, 162B includes an opening (not numbered) for the output compression member 186A, 186B and openings (not numbered) for the output optical cables 133, 133B. The first and second output fiber gel inserts 162A, 162B may be any deformable material capable of deforming and providing a seal about the output optical cables 133, 133B and sealing the first and second channels 113A, 113B of the cap body 111. Example materials for the first and second output fiber gel inserts 162A, 162B include, but are not limited to, rubber, elastomers, silicone, and the like.

The example first and second output compression members 186A, 186B are each configured as a rod having a bolthead 180A, 180B at the respective output fiber compression plate 181A. The first and second output compression members 186A, 186B are positioned through the respective first and second output fiber gel inserts 162A, 162B such that the threaded end opposite from the bolthead 180A, 180B is engaged with the respective self clinching nut 187A, 187B of the output fiber plate 140. Rotation of the bolthead 180A, 180B causes the respective output fiber compression plate 181A, 181B to be drawn closer to the output fiber plate 140, thereby compressing the respective first and second output fiber gel inserts 162A, 162B. Compression of the first and second output fiber gel inserts 162A, 162B causes the first and second output fiber gel inserts 162A, 162B to expand in a direction orthogonal to the axes of the output compression members 186A, 186B, which further causes the first and second output fiber gel inserts 162A, 162B to close around the output optical cables 133. Expansion of the first and second output fiber gel inserts 162A, 162B in the direction orthogonal to the axes of the output compression members 186A, 186B further causes the first and second output fiber gel inserts 162A, 162B to be pressed against the walls of the cap body 111 within the first and second channels 113A and 113B, respectively. In this manner, the cap body 111 is sealed at the first and second channels 113A, 113B, and at the first and second plurality of output optical cables 133, 133B.

Referring once again to FIGS. 2A and 2B, the example terminal assembly 120 includes first and second output fiber strain relief assemblies 121A, 121B operable to provide strain relief for the output optical cables of the first and second pluralities of output optical cables 133, 133B. It should be understood that more or fewer output fiber strain relief assemblies may be provided depending on the number of groups or pluralities of output optical cables. In the illustrated example, each of the first and second output fiber strain relief assemblies 121A, 121B are aligned with a respective plurality of output fiber openings 142 of the output fiber plate 140. The first and second output fiber strain relief assemblies 121A, 121B define an output fiber termination assembly.

Figure 4:
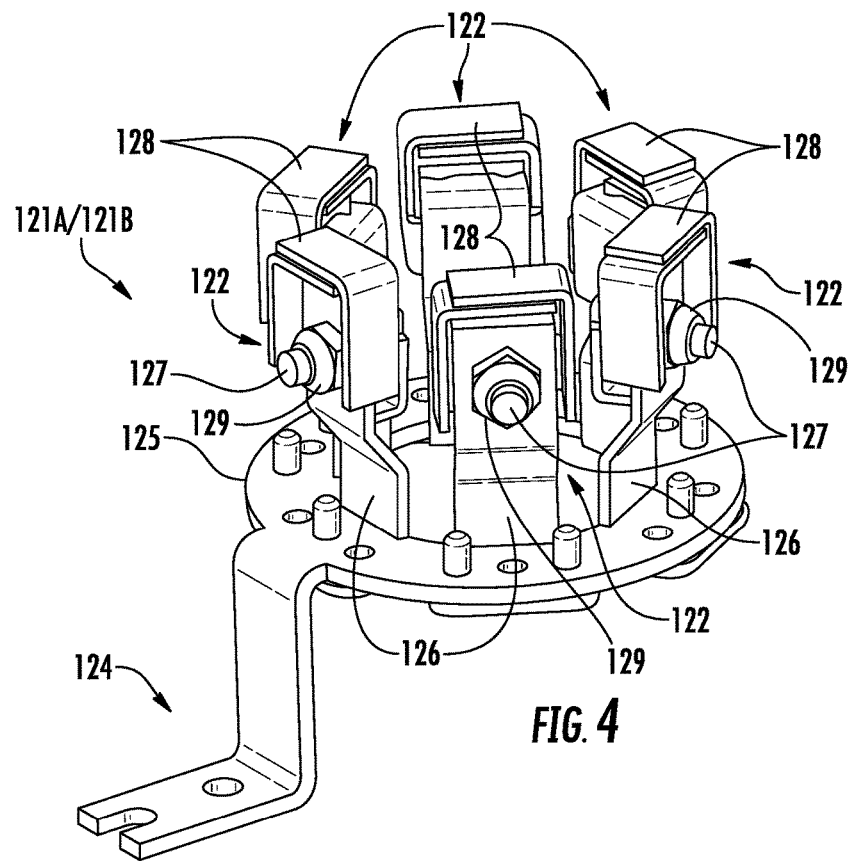
FIG. 4 illustrates an example output fiber strain relief assembly of the terminal assembly depicted in FIGS. 2A and 2B according to one or more embodiments described and illustrated herein.

Referring to FIG. 4, the output fiber strain relief assembly 121A/121B is depicted. The first and second output fiber strain relief assemblies 121A, 121B each include a frame portion 125 which, in the illustrated example, is circular in shape to correspond with the circular arrangement of the output fiber openings 142. However, it should be understood that embodiments are not limited to a circularly shaped frame portion 125, and that other shapes are also possible.

The output fiber strain relief assembly 121A/121B further includes an output fiber strain relief bracket 124 extending from the frame portion 125. The example output fiber strain relief bracket 124 is illustrated as having an "L" shape such that the frame portion 125 is positioned above a surface of the output fiber plate 140 (see FIGS. 2A and 2B). It should be understood that embodiments are not limited to an "L" shaped output fiber strain relief bracket 124, and that other configurations are also possible. The output fiber strain relief bracket 124 includes features such that it may be fastened to the output fiber plate 140 (or, alternatively, the input fiber plate 170), such as holes (not numbers) for mating with posts on the output fiber plate 140 or any other fastening means.

A plurality of output fiber strain relief members 122 extend from the frame portion 125. Each output fiber strain relief member 122 comprises an output strain relief bracket 126 and an output fiber central member 128 at a freestanding end of the output strain relief bracket 126. As described in more detail below, the output strain relief bracket 126 and the output fiber output fiber central member 128 cooperate to clamp one or more strength members of an output optical cable. The output fiber output fiber central member 128 of the illustrated example is coupled to the output strain relief bracket 126 by fastener hardware. In the illustrated example, the output fiber central member 128 includes a post 127 (e.g., a threaded post) that is disposed within a hole 135 of the freestanding end of the output strain relief bracket 126.

A nut 129 may then be threaded onto the post 127 to tighten the output fiber central member 128 to the output strain relief bracket 126. It should be understood that other coupling methods may be utilized to couple the output fiber central member 128 to the output strain relief bracket 126.

In the illustrated example, each output fiber strain relief member 122 is coupled to the frame portion 125 such that the output fiber strain relief member 122 extends from an interior surface of the frame portion 125. Any number of output fiber strain relief members 122 may be provided. The output fiber strain relief member 122 may extend from an exterior surface of the frame portion 125 in other embodiments. Any coupling means may be utilized to couple the output strain relief brackets 126 to the frame portion 125. In the example output fiber strain relief assembly 121A/121B of FIG. 4, the each output strain relief bracket 126 is coupled to the frame portion 125 by insertion of posts (not numbered) into holes (not numbered) of the frame portion 125. Additional fastening hardware may also be utilized, such as nuts, for example. In some embodiments, the posts of the output strain relief bracket 126 may be welded to the frame portion 125. Any method may be used to connect the output strain relief brackets 126 to the frame portion 125. In some embodiments, the output strain relief brackets 126 are integral with the frame portion 125 such that it is a monolithic component.

With the arrangement depicted in FIG. 4, the output fiber strain relief members 122 of the first and second output fiber strain relief assemblies 121A, 121B surround the first and second pluralities of output optical cables 133, 133B and their respective output optical fibers 130A, 130B.

Sealing and strain relief of the input and output optical cables will now be described in detail. Referring to FIGS. 1A and 1B, with the terminal assembly 120 coupled to the cap body 111 such that the input fiber gel insert 160, the first output fiber gel insert 162A, and the second output fiber gel insert 162B are disposed with the respective openings as described above, one or more input optical cables 131, are disposed within one or more openings (not numbered) of the input fiber gel insert 160 and pass through the input optical cable openings 175 of the input fiber plate 170 (FIG. 2A).

Figure 10:
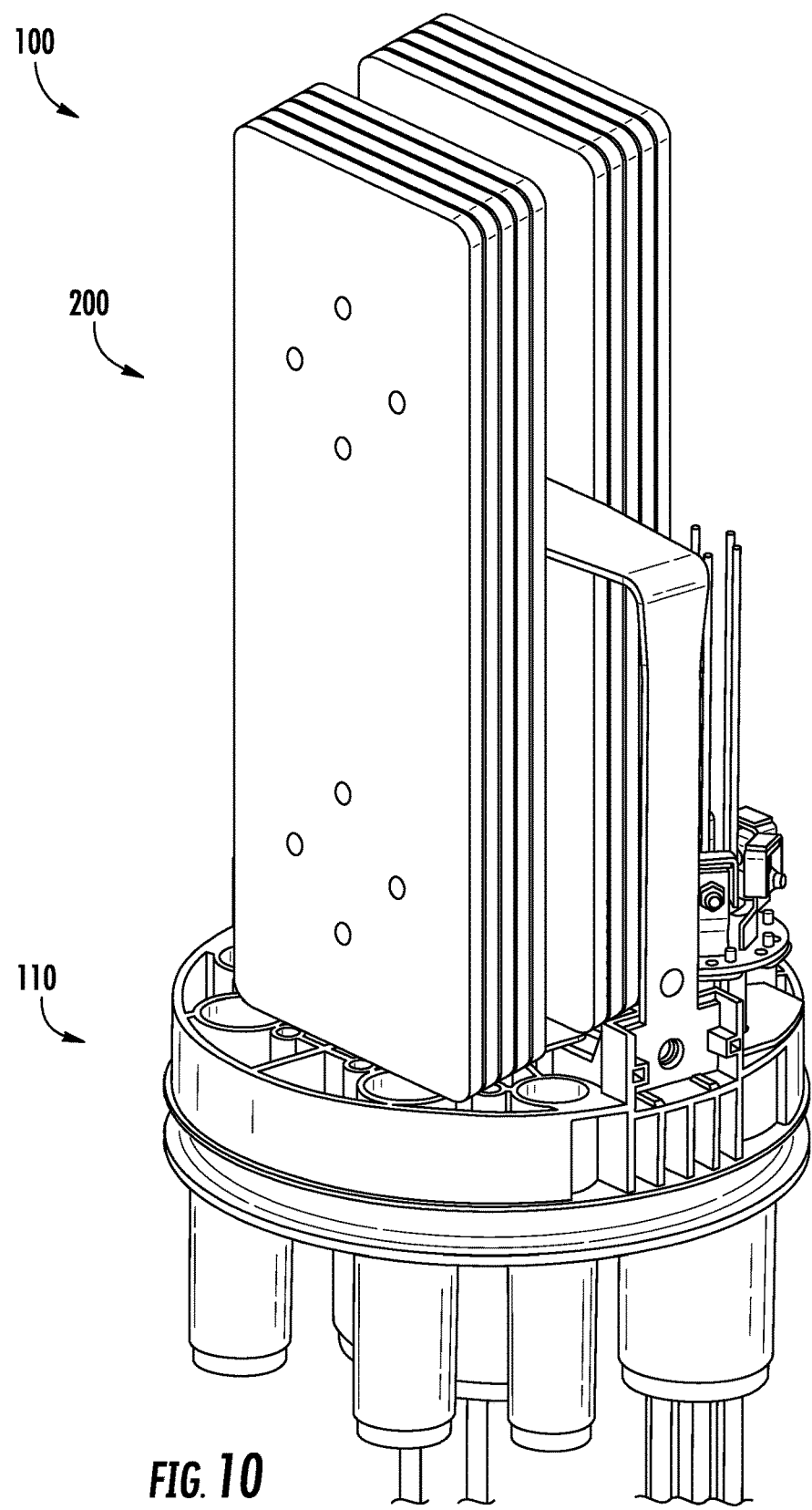
FIG. 10 illustrates an example end cap assembly further comprising a frame and a plurality of optical splitter modules coupled to a cap body according to one or more embodiments described and illustrated herein.

The jacket of the input optical cable 131 is stripped, thereby exposing pluralities of input optical fibers 132A, 132B of the input optical cable 131. As a non-limiting example, the pluralities of input optical fibers 132A, 132B may be optically coupled to one or more optical splitter modules 200, as depicted in FIG. 10, for example. The optical splitter modules 200 may be operable to split a single optical fiber signal into two or more optical fiber signals such that the optical signals propagating within the single optical fiber may be routed to more than one termination location (e.g., multiple dwellings or places of business).

Figure 6:
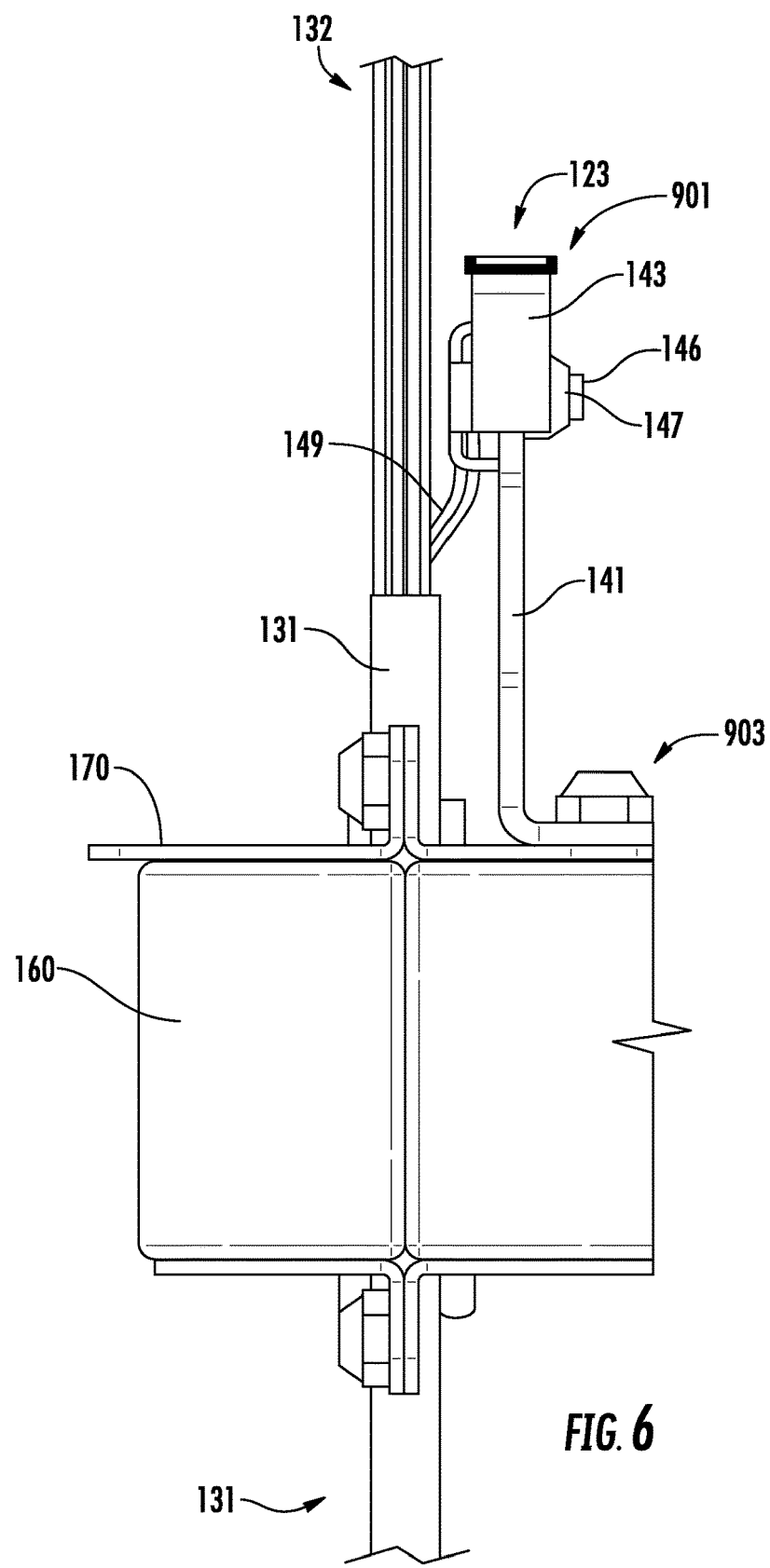
FIG. 6 illustrates a cross-sectional view of an example input fiber strain relief member according to one or more embodiments described and illustrated herein.

Referring now to FIG. 6, a partial side elevation view of an input optical cable 131 and an input fiber strain relief assembly 123 of the terminal assembly 120 is illustrated. The cap body 111 is not depicted for ease of illustration. The input optical cable 131 passes through the input fiber gel insert 160 and the input fiber plate 170. The jacket (not numbered) of the input optical cable 131 is stripped or otherwise removed to expose the internal input optical fibers 132 as well as one or more strength members 149 configured to provide strength and rigidity to the input optical cable 131. The one or more strength members 149 may be made of any suitable material, such, without limitation, metal material or Kevlar.

The strength member 149 is positioned between the input fiber strain relief bracket 141 and the central member 143.

The strength member 149 may be clamped between the input fiber strain relief bracket 141 and the input fiber input fiber central member 143 by, for example, tightening nut 147 (or other hardware). For example, the input fiber central member 143 may include a post 146 (e.g., a threaded post) that is disposed through a hole of the input fiber strain relief bracket 141. The nut 147 may be tightened to capture the strength member 149 between the input fiber strain relief bracket 141 and the central member 143. Other clamping means may also be provided, such as crimping the input fiber central member 143 using a crimping tool. In this manner, strain relief is provided by the connection of the strength member 149 to the freestanding end of the input fiber strain relief assembly 123. Because the input fiber strain relief assembly 123 has a freestanding end, and is not coupled to any other component of the enclosure (e.g., a frame member 150 (FIG. 9) coupled to the cap body 111), the strength members 149 may be easily connected to the input fiber strain relief assemblies 123 prior to connecting remaining components (e.g., the frame member 150).

Figure 7C:
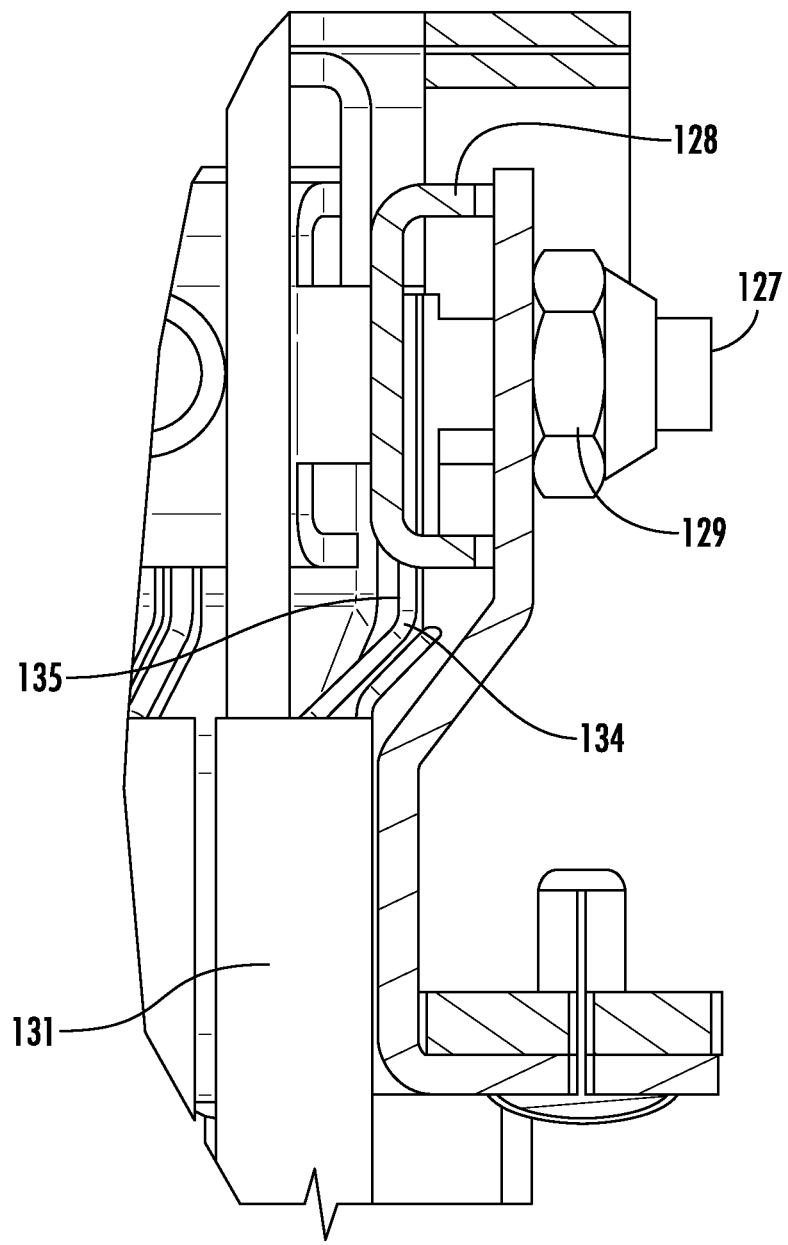
FIG. 7C illustrates a cross-sectional view of the output fiber strain relief member depicted in FIG. 7B according to one or more embodiments described and illustrated herein.

Referring once again to FIGS. 1A and 1B, as well as FIGS. 7A-7C, the output optical cables 133 pass through output fiber openings 142 of the output fiber plate 140 and the first and second output fiber gel inserts 162A and 162B, respectively. The output optical cables 133 and their respective output optical fibers 130 (FIG. 7A) also pass through the first and second output fiber strain relief assemblies 121A, 121B, respectively. The number of output fiber strain relief members 122 may correspond with the number of output optical cables and the number of output fiber openings 142.

As shown in FIGS. 7A-7C, each output optical cable 133 (i.e., of the first plurality of output optical cables 133 and the second output optical cable 133B) is associated with an individual output fiber strain relief member 122. Each output optical cable 130 includes a strength member 134. The strength member 134 may be made from any appropriate material, such as metal or Kevlar, for example. The strength member 134 may be positioned and clamped between the output fiber central member 128 and the output strain relief bracket 126 by tightening the nut 129 about the threaded post 127, for example. Other clamping means may also be provided, such as crimping the output fiber central member 128 using a crimping tool. In this manner, strain relief is provided by the connection of the strength member 134 to the freestanding end of the output fiber strain relief member 122. Because the output fiber strain relief member 122 has a freestanding end, and is not coupled to any other component of the enclosure (e.g., a frame member 150 coupled to the cap body 111 (see FIG. 9)), the strength members 134 may be easily connected to the output fiber strain relief members 122 prior to connecting remaining components (e.g., the frame member 150).

Either before or after strain relieving the input and output optical cables, a seal may be created about the input and output optical cables within the cap body 111 as described above. For example, referring to FIG. 5, the input optical cables 131 are sealed by tightening the bolthead 183 of the input fiber compression member 188 to draw the input fiber compression plate 190 closer to the input fiber plate 170, thereby compressing the input fiber gel insert 160. Similarly, the first and second pluralities of output optical cables 133, 133B are sealed by tightening boltheads 180A, 180B of first and second output compression members 186A, 186B to draw the first and second output fiber compression plates 181A, 181B closer to the output fiber plate 140, thereby compressing the first and second output fiber gel inserts 162A, 162B.

Figure 8A:
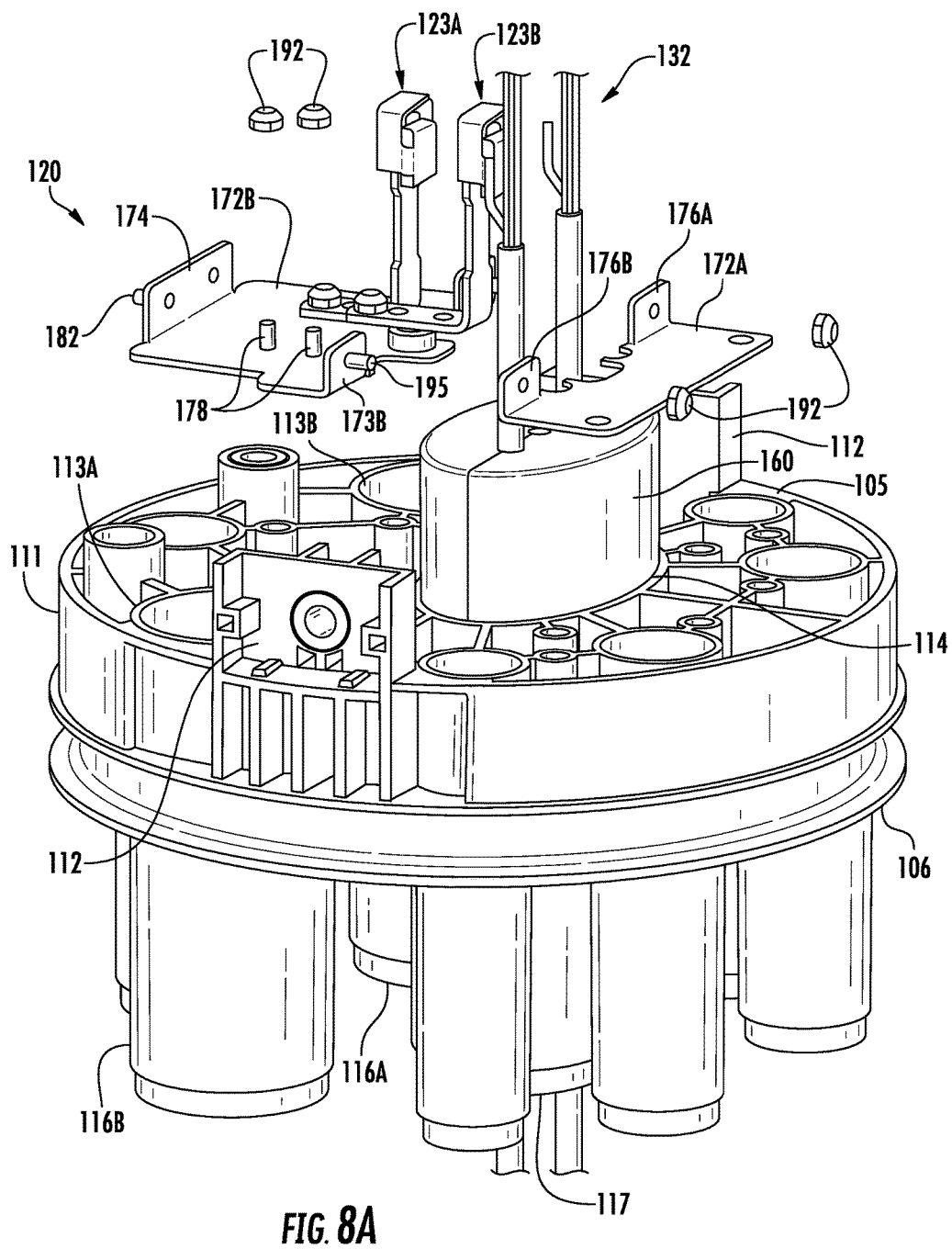
FIGS. 8A-8D schematically depict assembly of the example end cap assembly depicted in FIGS. 1A and 1B according to one or more embodiments described and illustrated herein.
Figure 8B:
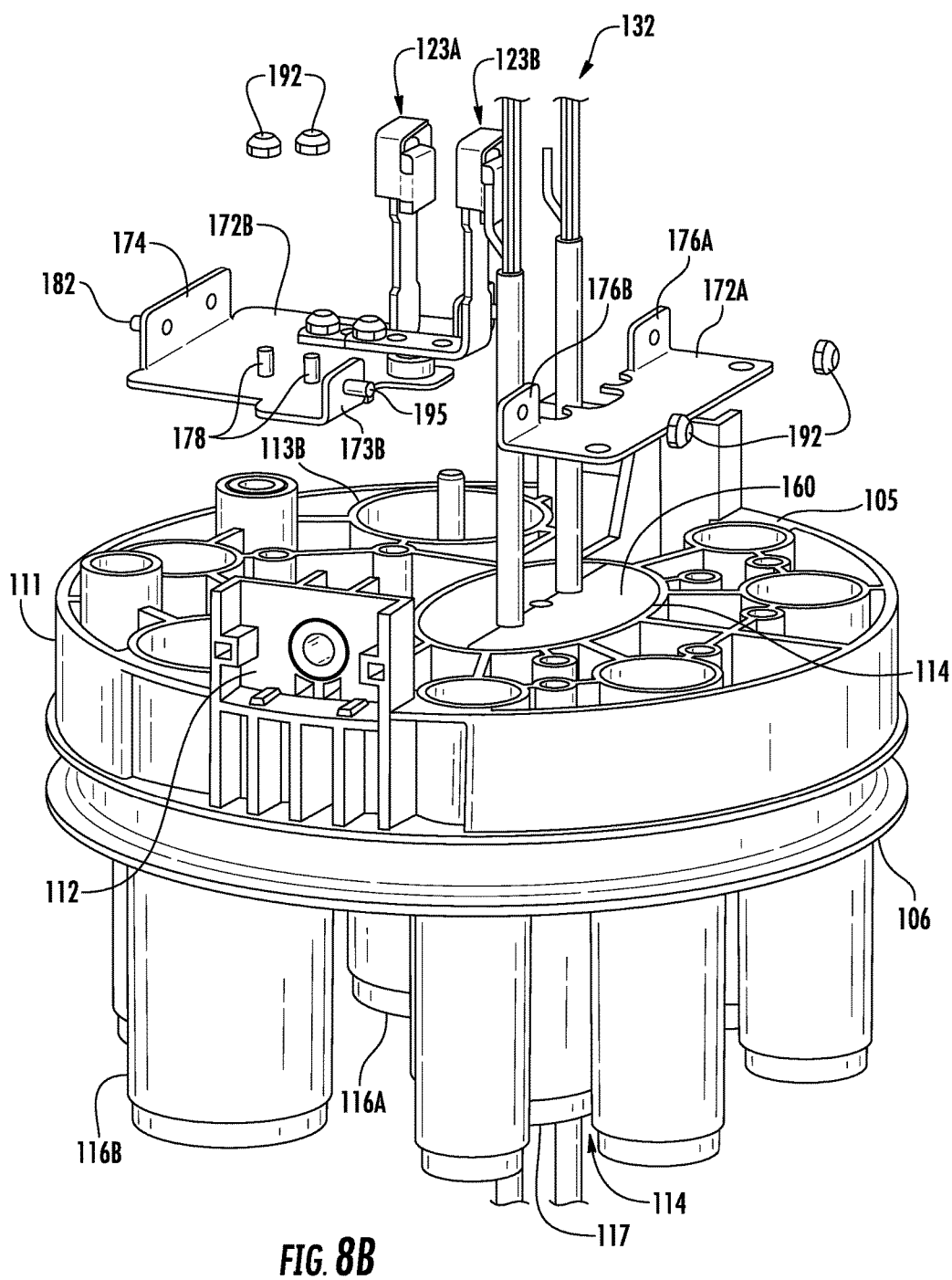

Referring now to FIGS. 8A-8D and 9, assembly of the example end cap assembly 110 depicted in FIGS. 1A and 1B will now be described. The input optical cables 132 are disposed through channel 114 and through the input fiber gel insert 160. Posts 195 at flanges 173A, 173B of the second input fiber plate 172B are disposed within holes of flanges 176A, 176B of the first input fiber plate 172. Nuts 192 are tightened around posts 195 to secure the second input fiber plate 172B to the first input fiber plate 172A. The first and second input fiber strain relief assemblies are coupled to the second fiber input plate 172B by posts 178 and nuts 192. As shown in FIG. 8B, the input fiber get insert 160 is disposed within channel 114 of the cap body 111.

Figure 8C:
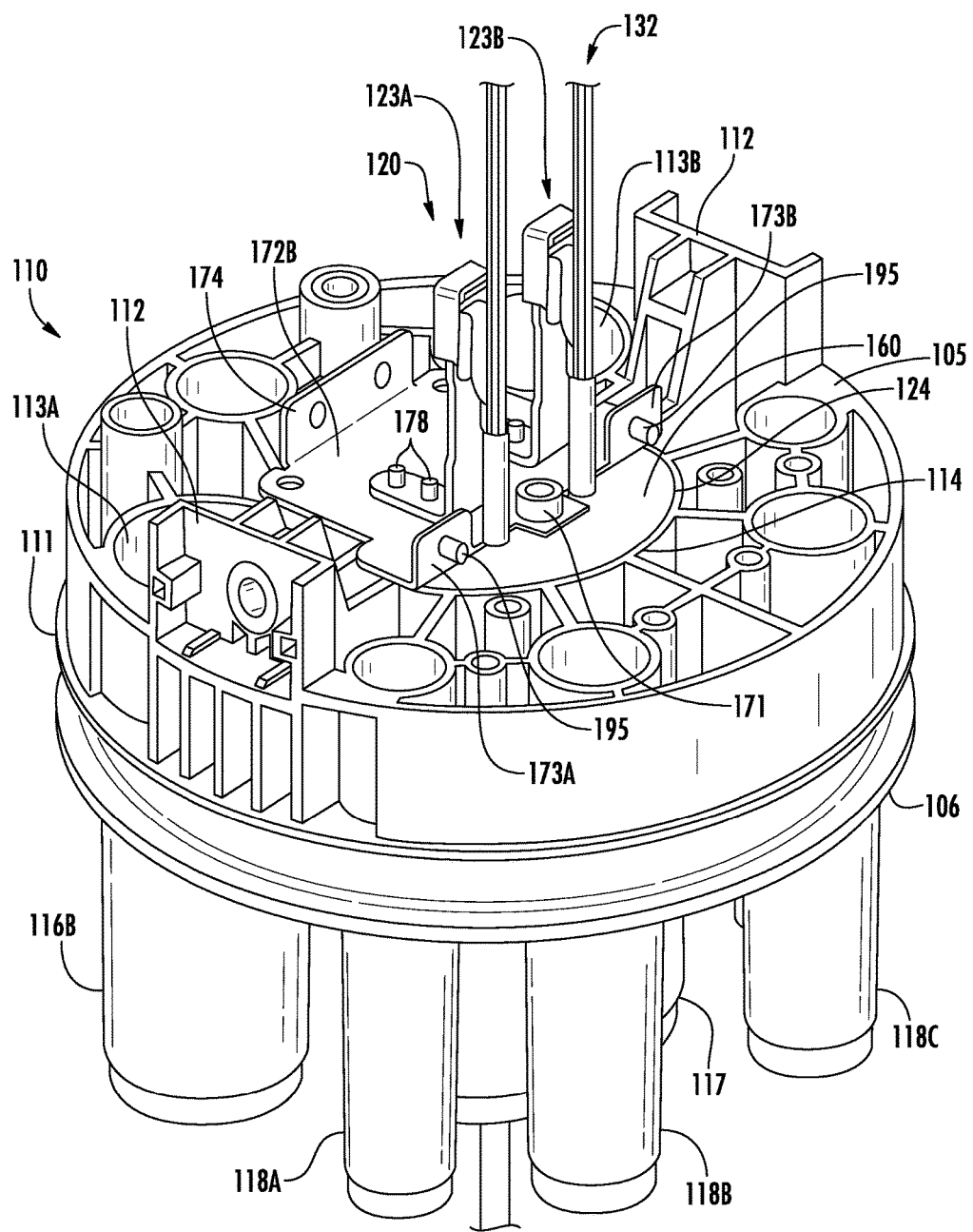
Figure 8D:
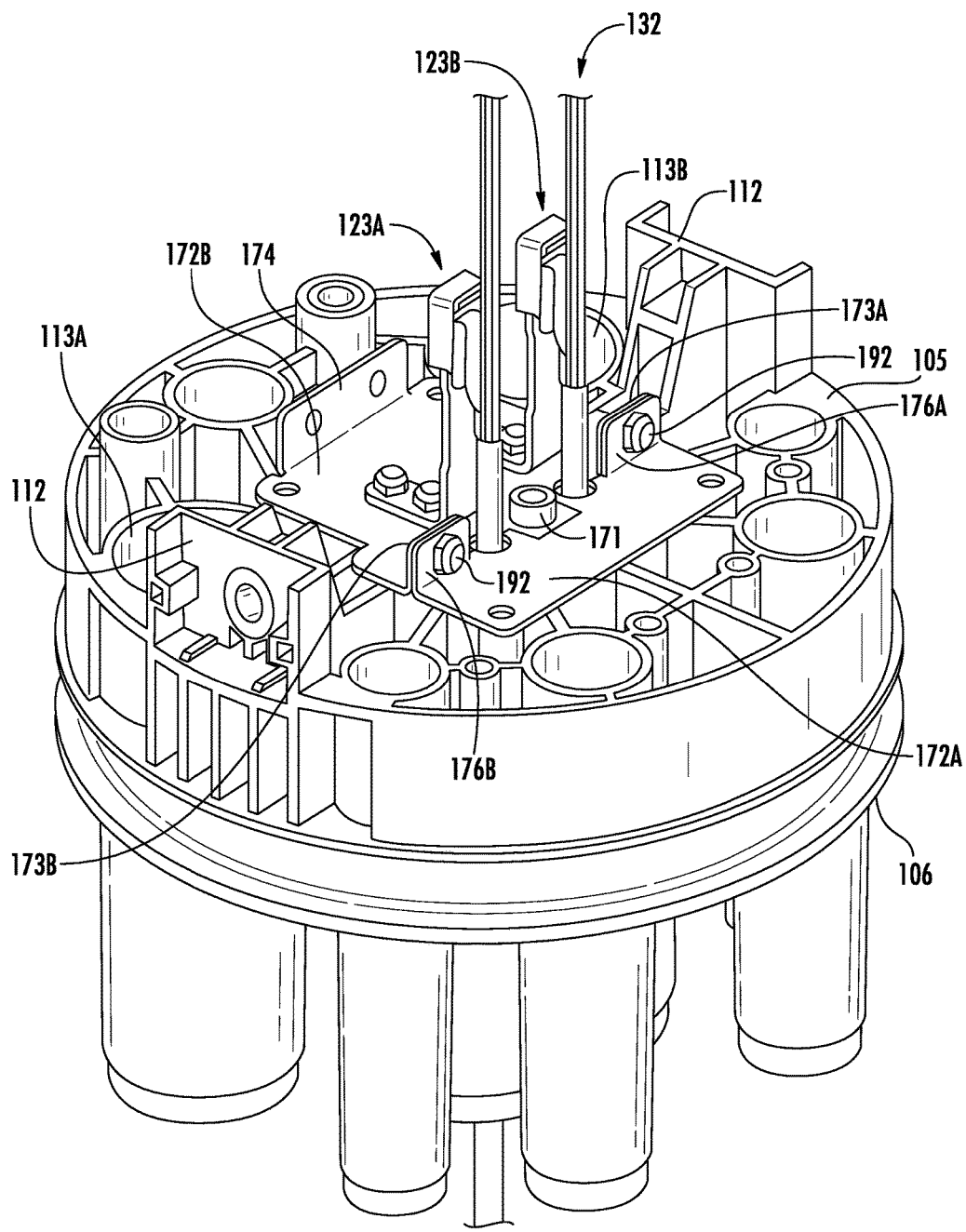

As shown in FIGS. 8C-8D, the first and second input fiber plates 172A, 172B may be coupled to the first side 105 of the cap body 111 using mechanical fasteners (not shown). Referring to FIGS. 1A and 1B, the output fiber sealing assembly 104 is coupled to the first side 105 of the cap body 111 and the first flange 174 of the second input fiber plate 172B. For example posts 182 on the first flange 174 (see FIGS. 8A and 8B) may be disposed in openings of a flange 148 of the output fiber plate 140 and secured with nuts 192. The first and second output fiber gel inserts 162A, 162B are disposed within first and second channels 113A, 113B, respectively. The output fiber plate 140 may coupled to the first side 105 of the cap body 111 using additional mechanical fasteners.

Figure 9:
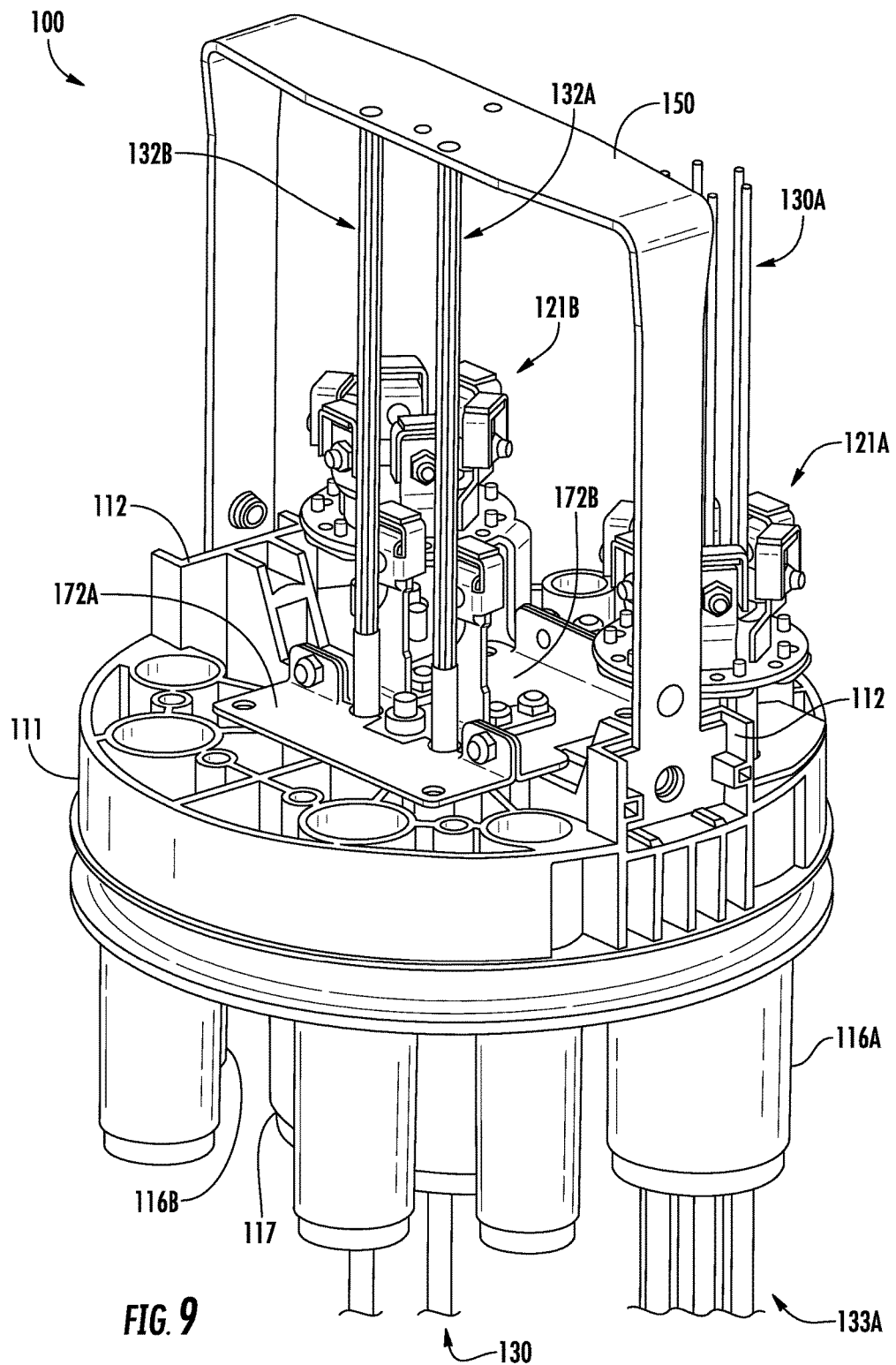
FIG. 9 illustrates an example end cap assembly further comprising a frame coupled to a cap body according to one or more embodiments described and illustrated herein.

Referring now to FIG. 9, the output fiber strain relief brackets 124 of the first and second output fiber strain relief assemblies 121A, 121B may be coupled to the output fiber plate 140 using posts and nuts (not numbered), for example.

Referring again to FIG. 9, the fiber optic enclosure 100 may further include a frame member 150 that is coupled to the cap body 111, as at attachment points 112. The frame member 150 may be connected to the cap body 111 by any mechanical fastener, such as a screw, for example. As shown in FIG. 9, the various strain relief assemblies described herein are not physically coupled to the frame member 150 in any way. Accordingly, the strain relief of the optical cables may be performed prior to connection of the frame member 150, which provides for a simpler process.

The frame member 150 may maintain additional components, such as one or more optical splitter modules 200 as shown in FIG. 10. The optical splitter modules 200 receive one or more input optical fibers, and split the one or more input optical signals into two or more output optical signals that then exit the fiber optic enclosure 100 on output optical cables (e.g., output optical cables 133). The optical splitter modules 200 may be connected to the frame member 150 by any means. As is known in the art, the frame member 150 may maintain components other than optical splitters, such as splice trays or electro-optical conversion components, and this disclosure is not limited any particular component or frame member 150.

Upon completion of the assembly of all of the internal components of the end cap assembly 110 (including the one or more optical splitter modules 200, for example), the cap body 111 may be coupled to a housing 101 as shown in FIG. 10. The housing 101 includes the internal components of the end cap assembly 110, such as the various fiber gel inserts, the strain relief assemblies, and the like. The cap body 111 may be coupled to the housing 101 by any means such that there is a seal between the cap body 111 and the housing. As a non-limited example, one or more grommets (not shown) may be disposed between the cap body 111 and the housing 101, and hardware, such as screws or clamps, may be utilized to fasten the housing to the cap body 111.

Figure 12:
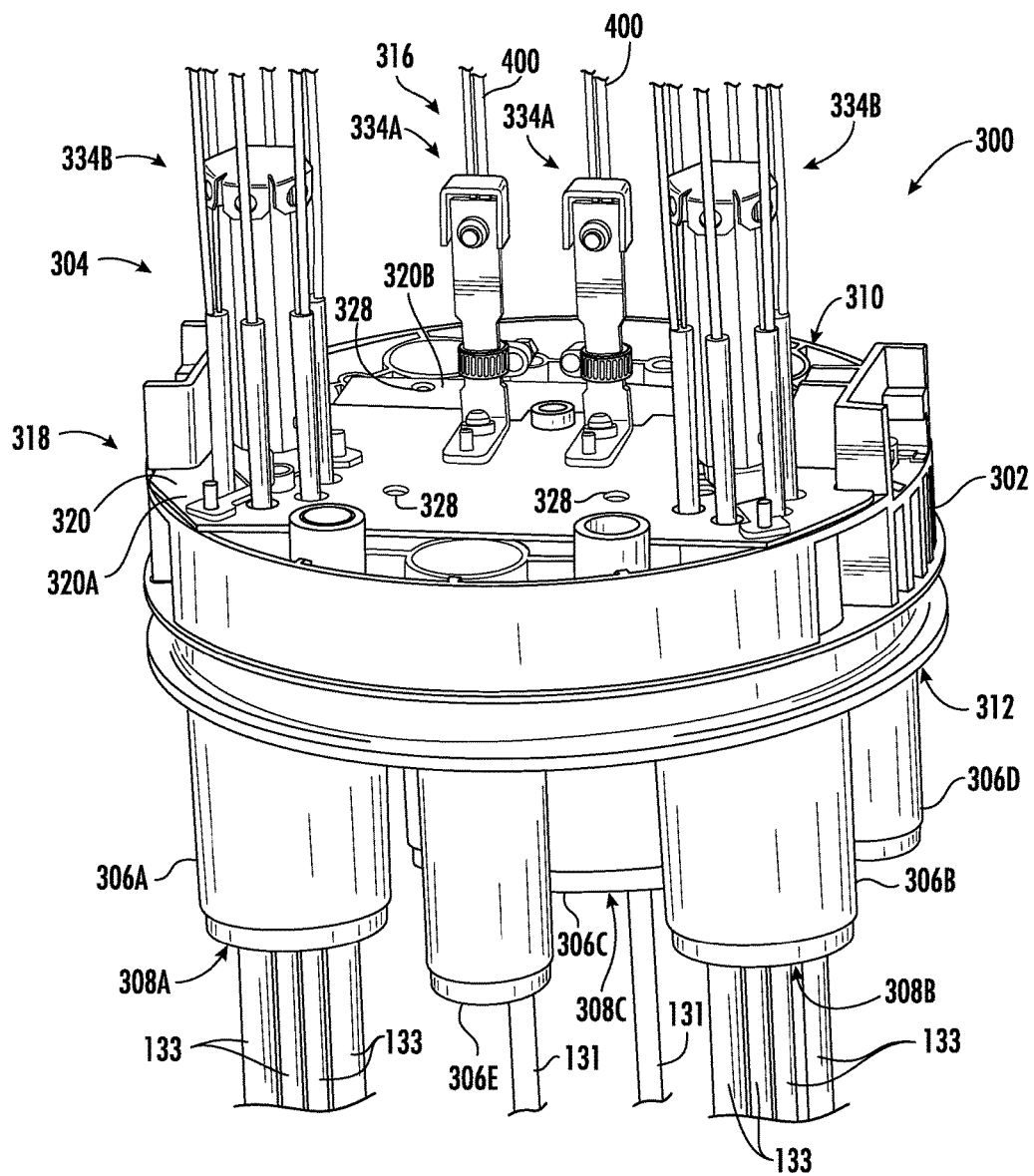
FIG. 12 illustrates a perspective view of another example end cap assembly comprising an example terminal assembly coupled to an example cap body according to one or more embodiments described and illustrated herein.
Figure 13:
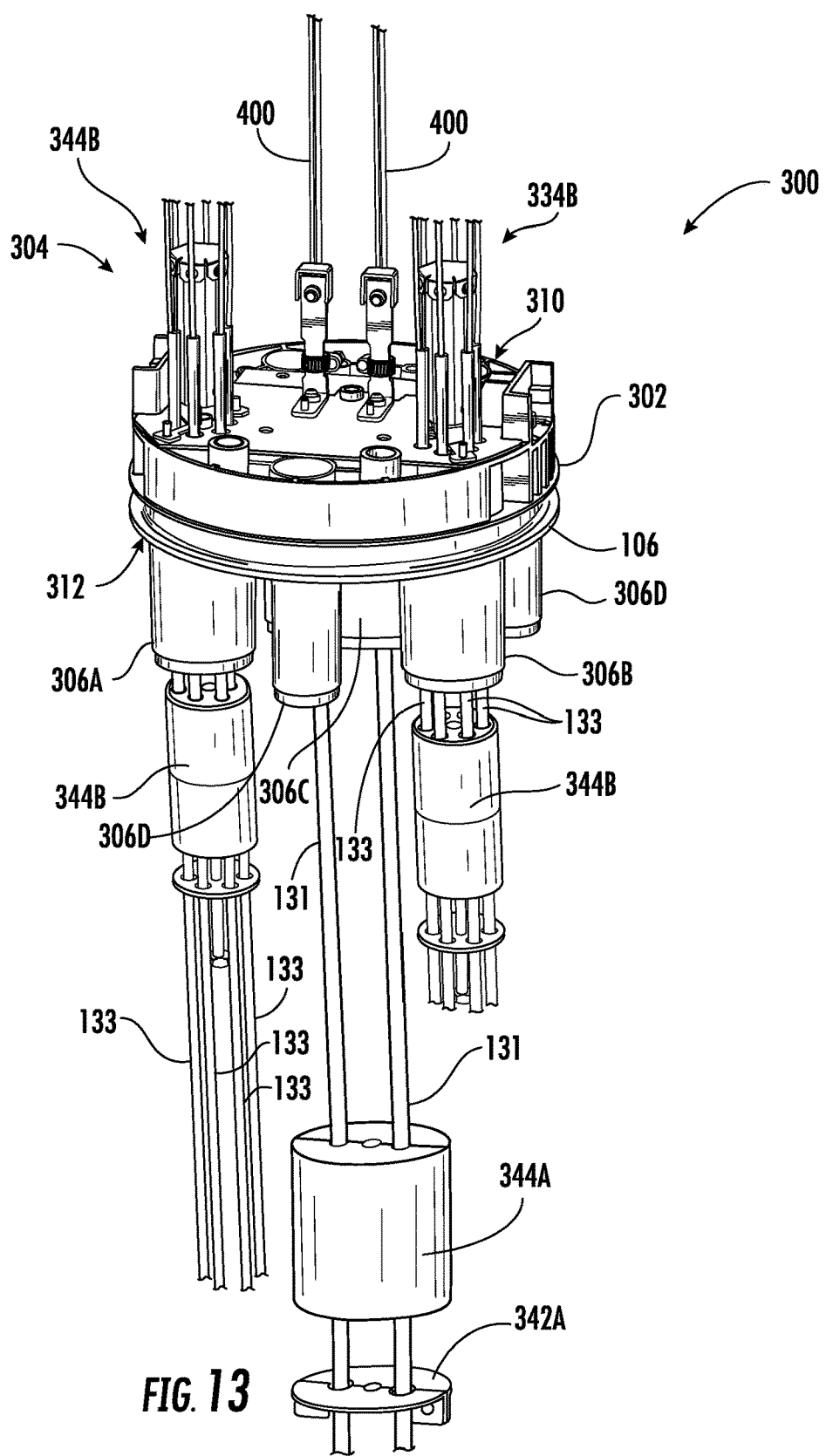
FIG. 13 illustrates an exploded view of the example end cap assembly of FIG. 12 according to one or more embodiments described and illustrated herein.

FIGS. 12 and 13 illustrate another example embodiment of an end cap assembly 300 for a fiber optic enclosure, such as the fiber optic enclosure 100 of FIG. 11. As described in detail below, the end cap assembly 300 both seals the fiber optic enclosure about an input optical cable 131 and output optical cables 133, as well as provides strain relief to the input optical cable 131 and the output optical cables 133. The end cap assembly 300 is coupleable to a housing (e.g., housing 101 in FIG. 11) to enclose the components disposed therein.

The example end cap assembly 300 generally comprises a cap body 302 and a terminal assembly 304. Although the example cap body 302 is illustrated as being circular in shape, embodiments are not limited thereto. As non-limiting examples, the cap body 302 may be elliptical or rectangular in cross-section. The cap body 302 is similar to the cap body 111 described above. The cap body 302 includes a plurality of protrusions extending from a second side 312 and defining channels for components of the terminal assembly 304. For example, first and second protrusions 306A, 306B provide first and second channels 308A, 308B, respectively, for a plurality of output optical cables 133 to exit the fiber optic enclosure. As such, the first and second channels 308A, 308B extend between the first side 310 and the second side 312 of the cap body 302. It should be understood that more or fewer protrusions and channels may be provided for more or fewer groups of output optical cables. In addition, the cap body 302 also includes a third protrusion 306C providing a channel 308C for an input optical cable 131. It should be understood that more input optical cables 131 may be provided. In other embodiments, the cap body 302 may not include protrusions but rather the channels for the input and output optical cables 131, 133 may be disposed completely within the cap body 302.

The additional protrusions 306D, 306E and openings of the cap body 302 illustrated in FIGS. 12 and 13 may accommodate additional input/output fibers. The additional protrusions 306D, 306E and openings are sealed when not in use. In the embodiment illustrated in FIGS. 12 and 13, the additional protrusions 306D, 306E and openings are not in use and, thus, are sealed. The terminal assemblies described herein may be used to seal the additional protrusions 306D, 306E and openings, or the additional protrusion 306D, 306E and openings may be sealed using other sealing techniques, such as heat shrink sealing.

The terminal assembly 304 is coupled to the cap body 302. As will be described in more detail below, the terminal assembly 304 does not couple directly to a frame or other component of the fiber optic enclosure 100 which reduces the complexity of the fiber optic enclosure 100 and may also allow a technician to seal the input fiber optic cable 131 and the output fiber optic cables 133 in the end cap assembly 300 and strain relieve the input fiber optic cable 131 and the output fiber optic cables 133 without the need to first secure a frame or other components to the cap body 302.

Figure 14:
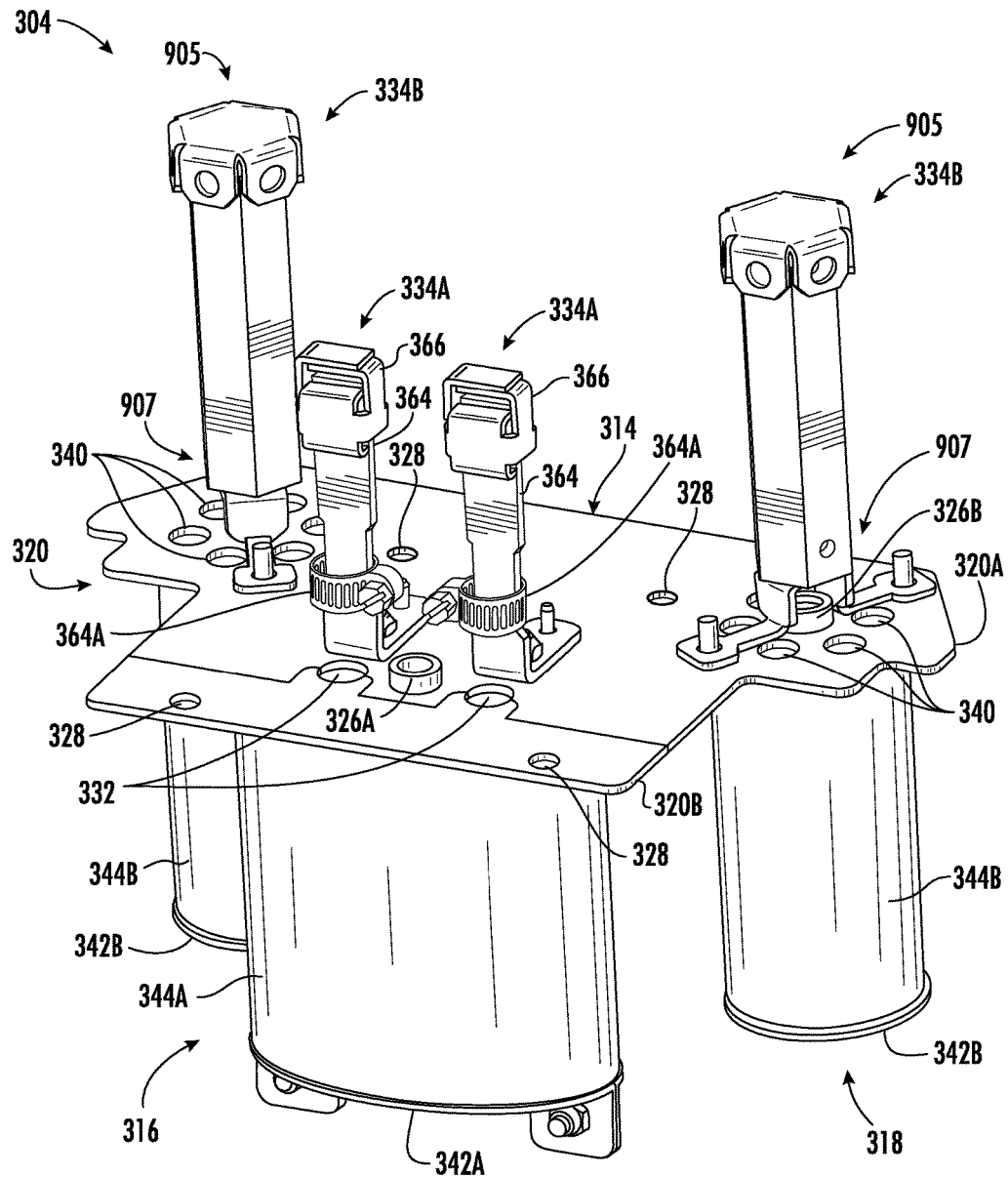
FIG. 14 illustrates a perspective view of the terminal assembly depicted in FIGS. 12 and 13 according to one or more embodiments described and illustrated herein.
Figure 15:
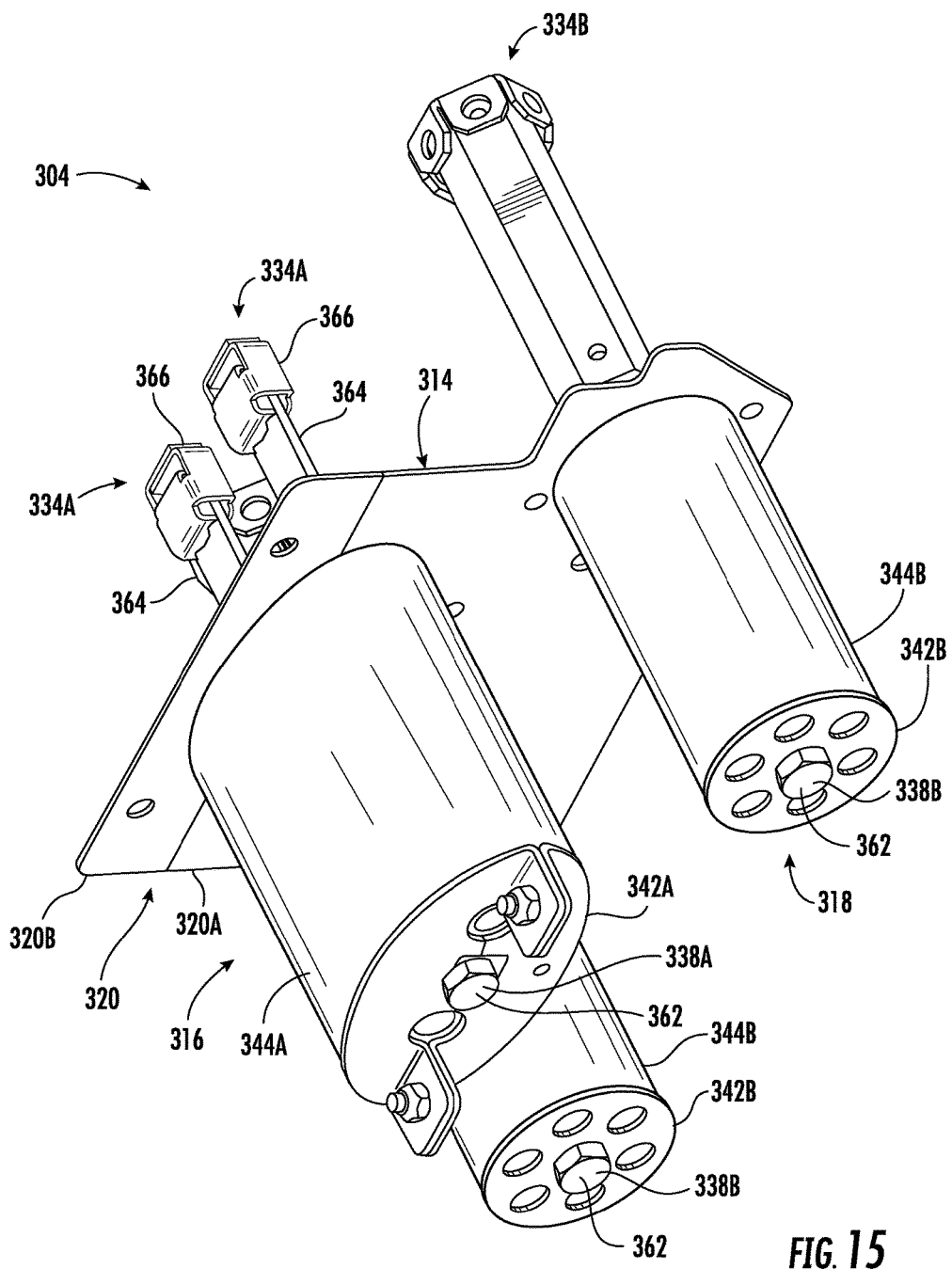
FIG. 15 illustrates a bottom perspective view of the terminal assembly depicted in FIG. 14 according to one or more embodiments described and illustrated herein.

FIGS. 14 and 15 illustrate the terminal assembly 304 of FIGS. 12 and 13 in greater detail. The terminal assembly 304 is configured to seal a fiber optic enclosure (such as, for example, fiber optic enclosure 100 of FIG. 11) from the environment and provide strain relief to the input optical cable 131 (FIG. 12) and the output optical cables 133 (FIG. 12). Generally, the terminal assembly 120 includes a base plate 314, an input fiber sealing assembly 316, and an output fiber sealing assembly 318. As described in more detail below, the base plate 314 and the input fiber sealing assembly 316 are operable to seal the end cap assembly 300 about the input optical cable 131 (FIG. 12) and terminate the strength members of the input optical cable 131. Similarly, the base plate 314 and the output fiber sealing assembly 318 are operable to seal the end cap assembly 300 about the output optical cables 133 (FIG. 12) and terminate the strength members of the output optical cables 133.

Figure 16:
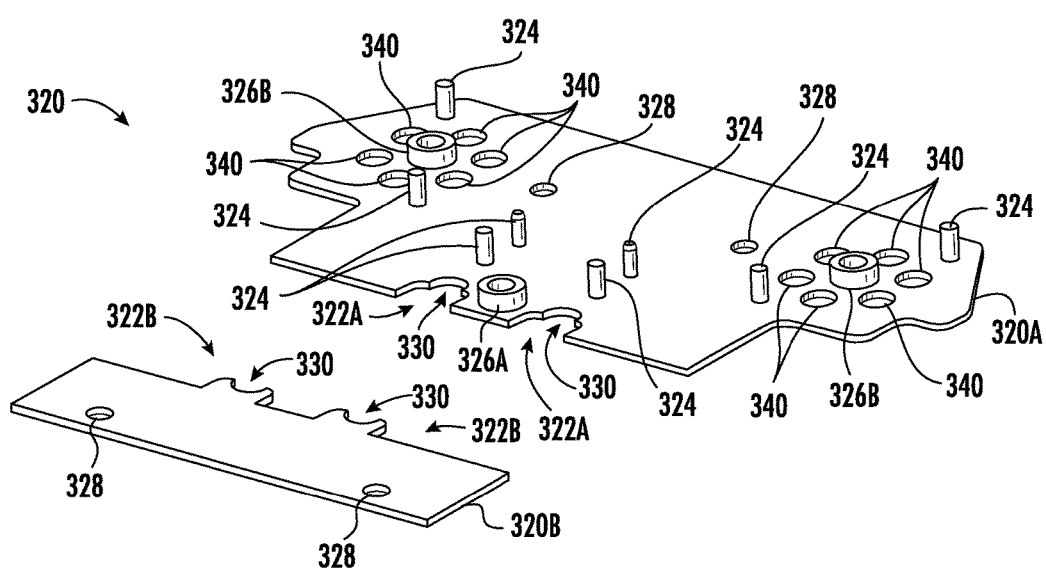
FIG. 16 illustrates an example base plate of the terminal assembly depicted in FIGS. 14 and 15 according to one or more embodiments described and illustrated herein.

FIG. 16 illustrates the base plate 314 in greater detail. In the illustrated embodiment, the base plate 314 comprises a first base plate section 320A and a second base plate section 320B. However, it should be understood that the baseplate 314 may be configured as a single, unitary component, or three or more plates or components. The first base plate section 320A is substantially planar and includes at least one cutout 322A, a plurality of posts 324, a plurality of integral self clinching nuts 326, and a plurality of openings 328. The cutouts 322A are positioned at the edge of the first base plate section 320A that mates to the second base plate section 320B. Each of the cutouts 322A corresponds to at least one extension 322B on the mating edge of the second base plate section 320B. The cutouts 322A of the first base plate section 320A and the extensions 322B of the second base plate section 320B each include a notch 330 for receiving input optical cables 131 when the first base plate section 320A is mated to the second base plate section 320B. When the first base plate section 320A and the second base plate section 320B are engaged, as illustrated in FIGS. 14 and 15, the notches 330 cooperate with each other to define input optical cable openings 332 (FIG. 14) through which the input optical cable 131 passes. The size and shape of the input optical cable openings 332 formed by the notches 330 correspond to the size and cross-sectional shape of the input optical cable 131. The notches 330, and therefore the input optical cable openings 332 formed by the notches 330, may have different sizes and shapes to correspond to the sizes and shape of various types of input optical cables 131.

Referring again to FIG. 16, the plurality of posts 324 of the first base plate section 320A are for coupling the input fiber strain relief members 334A (see, e.g., FIG. 14) and the output fiber strain relief members 334B (see, e.g., FIG. 14) to the first base plate section 320A. As an example and not a limitation, the posts 324 may be threaded to receive nuts to couple the input fiber strain relief members 334A and the output fiber strain relief members 334B to the first base plate section 320A. It should be understood that other fastening means may also be utilized.

The first base plate 314 section also includes a plurality of integral self clinching nuts 326. The first self clinching nut 326A is provided between the cutouts 322A for receiving an input fiber compression member 338A (see, e.g., FIGS. 15, 21) configured as a rod having a threaded end. The threaded end of the input fiber compression member 338A engages internal threads of the self-clinching nut 326A.

The second and third self clinching nuts 326B are provided between groups of output fiber optic cable openings 340 (discussed in more detail below) for receiving an output fiber compression member 338B (see, e.g., FIGS. 15, 21) configured as a rod having a threaded end. The threaded end of each output fiber compression member 338B engages internal threads of the corresponding self clinching nut 326B. It should be understood that the input fiber compression member 338A and the output fiber compression members 338B may be coupled to the self-clinching nuts 326A, 326B by means other than the self-clinching nut 171. For example, in other embodiments, the first base plate section 320A includes threaded openings rather than, or in addition to, the self-clinching nuts 326A, 326B.

Referring still to FIG. 16, the first base plate section 320A also includes a plurality of output fiber optic cable openings 340 at two ends of the first base plate section 320A. In the illustrated example, the output fiber openings 340 form two groups that each define a circle; however, it should be understood that embodiments are not limited to the circular configuration of the output fiber openings 340. The number of output fiber openings 340 corresponds to the number of output fiber optic cables 133 (see e.g., FIG. 12). The number of output fiber optic cables 133 and output fiber cable openings 340 is not limited by this disclosure.

Referring again to FIG. 12, the first and second base plate sections 320A, 320B may be secured to the cap body 302 by any suitable means. In some embodiments, the first and second base plate sections 320A, 320B include openings 328 for receiving nuts (not shown) that secure the first and second base plate sections 320A, 320B to the cap body 302.

Figure 21:
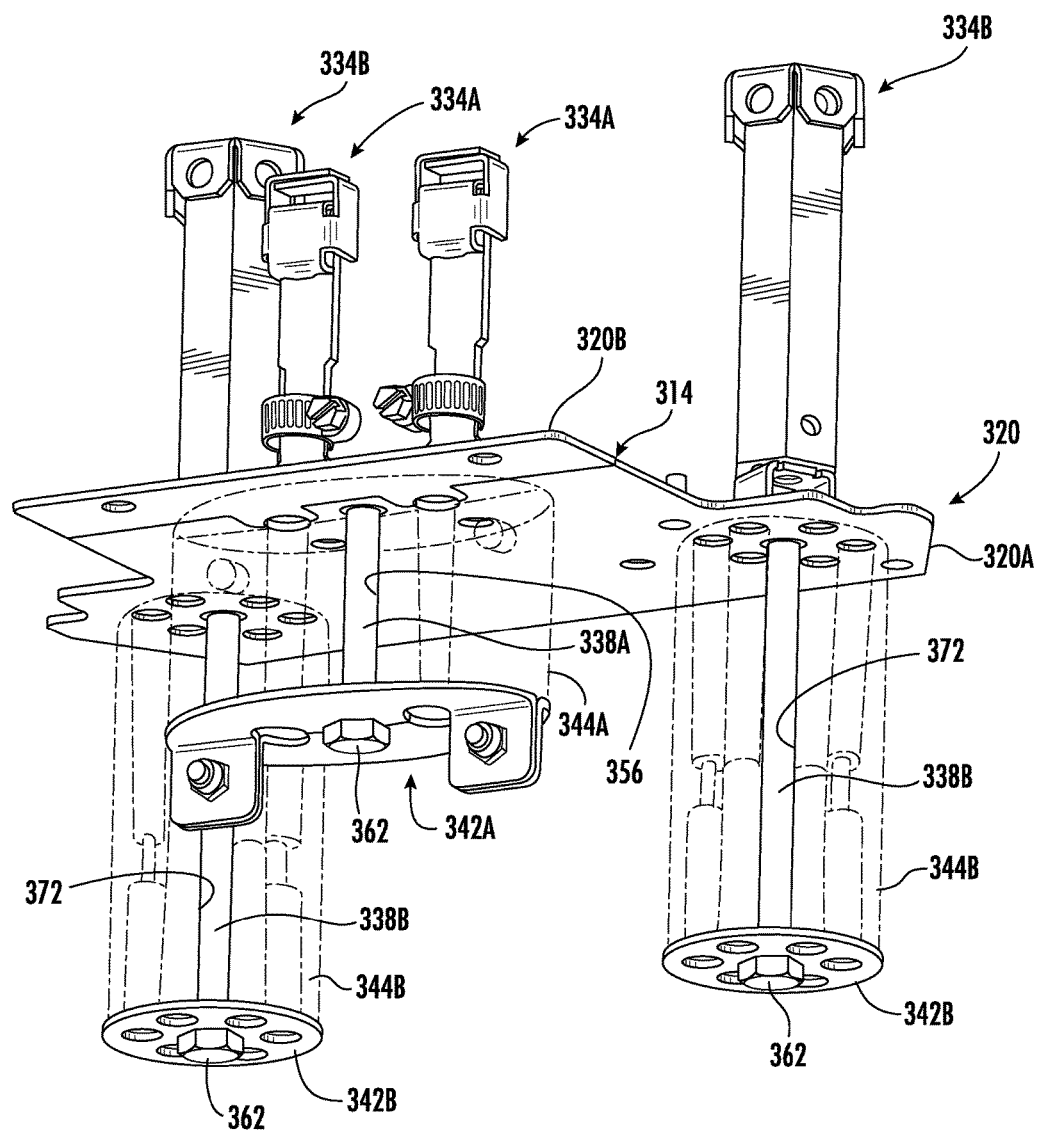
FIG. 21 illustrates a side perspective view of the terminal assembly depicted in FIGS. 14 and 15 according to one or more embodiments described and illustrated herein.

Referring again to FIGS. 14 and 15, the input fiber sealing assembly 316 of the example terminal assembly 304 comprises an input fiber compression plate 342A, an input fiber insert 344A disposed between the input fiber compression plate 342A and the base plate 314, an input fiber compression member 338A, and at least one input fiber strain relief member 334A. Referring momentarily to FIG. 21, the input fiber insert 344A is disposed within the input fiber channel 306C (FIG. 12) of the cap body 302 and between the base plate 314 and the input fiber compression plate 342A. The input fiber compression member 338A passes through the input fiber compression plate 342A, the input fiber insert 344A, and the base plate 314.

Figure 17A:
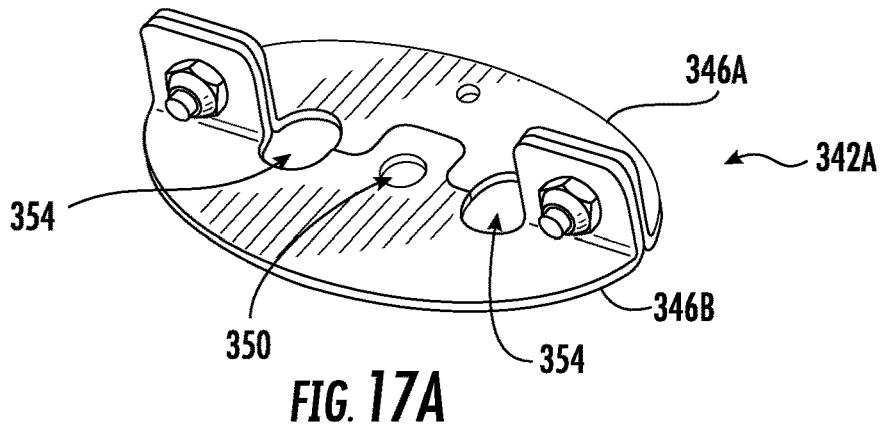
FIGS. 17A and 17B illustrate an example input fiber compression plate of the terminal assembly depicted in FIGS. 14 and 15 according to one or more embodiments described and illustrated herein.
Figure 17B:
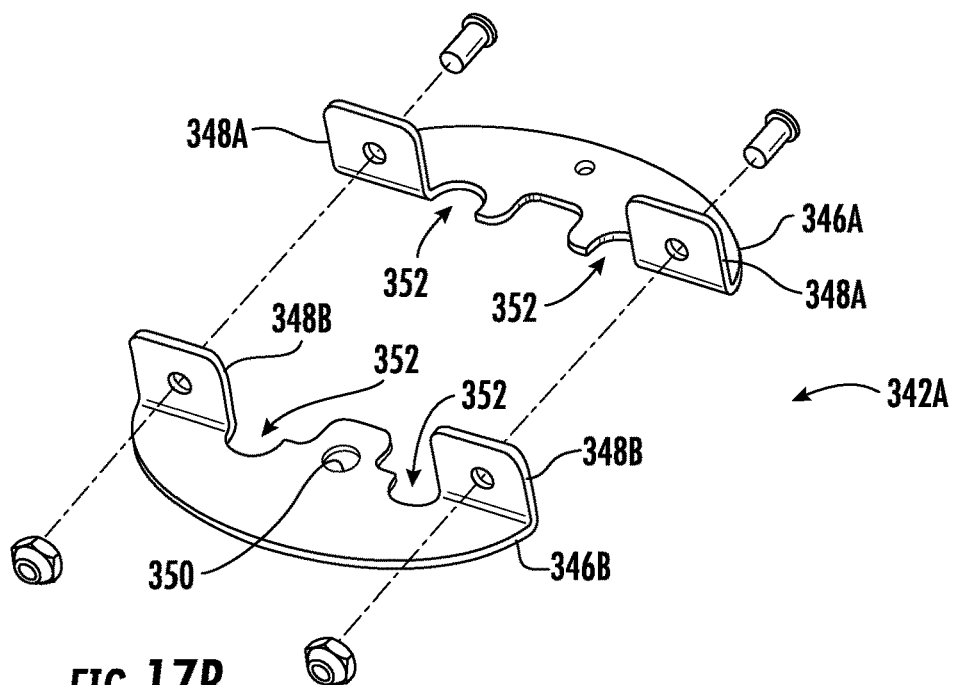

FIGS. 17A and 17B illustrate an embodiment of an example input fiber compression plate 342A. The input fiber compression plate 342A comprises a first plate member 346A and a second plate member 346B. The first and second plate members 246A, 346B include flanges 348A, 348B for coupling the first plate member 342A to the second plate member 342B by corresponding fasteners (not numbered). The first plate member 342A includes a central opening 350 for the input fiber compression member 338A (see, e.g., FIG. 21). In addition, the first and second plate members 346A, 346B each include cutouts 352 that define peripheral openings 354 (FIG. 17A) for the input fiber optical cable 131 (FIG. 12) when the first plate member 346A is coupled to the second plate member 346B. While the input fiber compression plate 342A is shown in two pieces, it should be understood that the input fiber compression plate 342A may be configured as a single, unitary component, or three or more plates or components.

Figure 19A:
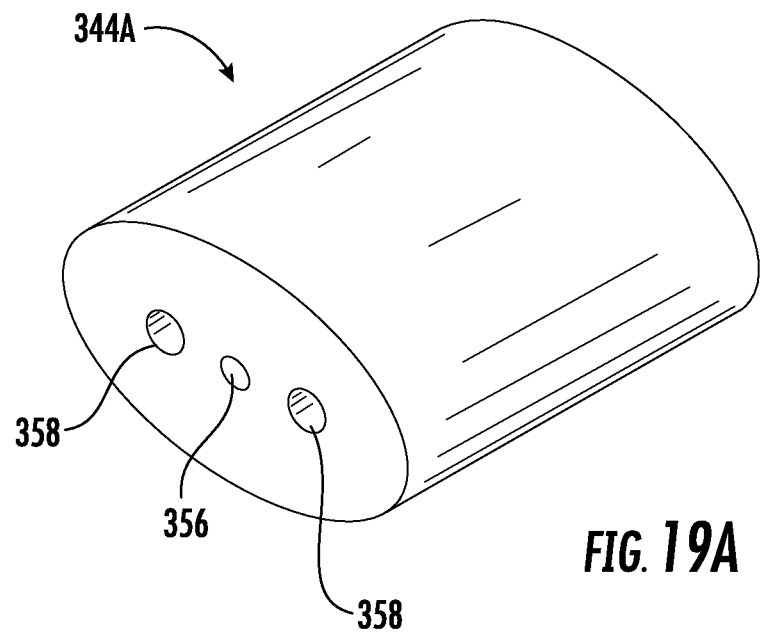
FIG. 19A illustrates a close-up, perspective view of an example output fiber insert of the terminal assembly depicted in FIGS. 14 and 15 according to one or more embodiments described and illustrated herein.
Figure 19B:
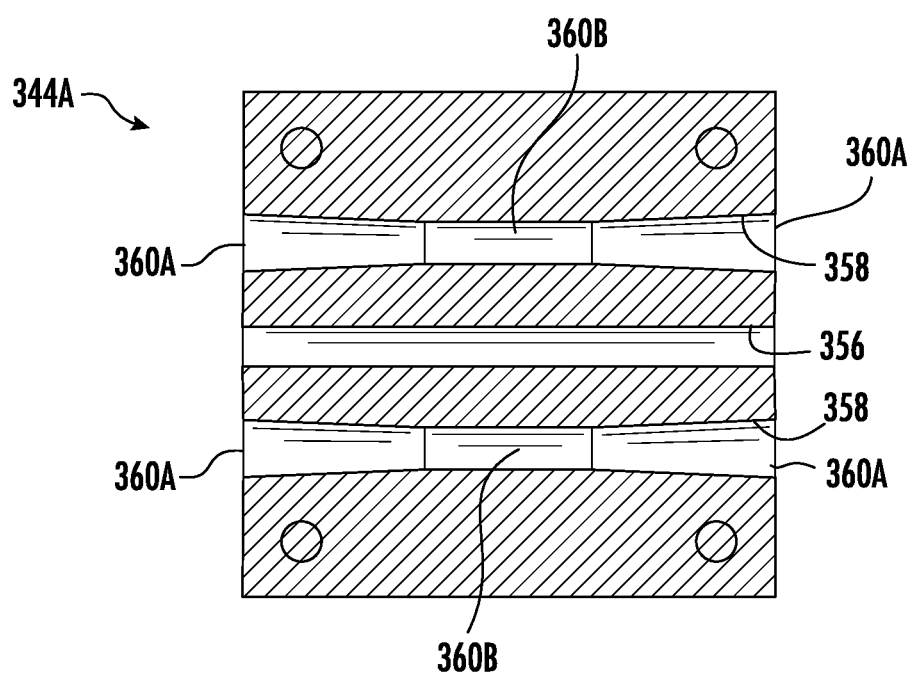
FIG. 19B illustrates a cross-sectional view of the example output fiber insert of FIG. 19A according to one or more embodiments described and illustrated herein.

FIG. 19A illustrates an example embodiment of an input fiber insert 344A and FIG. 19B illustrates a cross-sectional view of the example input fiber insert 344A of FIG. 19A. The input fiber insert 344A includes a central opening 356 for receiving the input fiber compression member 338A (see, e.g., FIG. 21) and peripheral openings 358 for receiving and sealing the input optical cables 131 (FIG. 12). The peripheral openings 358 may have a shape that accommodates various sizes of input optical cable 131. For example, referring specifically to FIG. 19B, the diameter of the peripheral openings 358 at the exterior ends 360A may be larger than the diameter at the center 360B (i.e., half way between the exterior ends 360A) of the peripheral openings 358. The tapered inner surface of the peripheral openings 358 may define a frustro-conical shape wherein the diameter of the peripheral opening 358 decreases towards the center 360B of the peripheral opening 358. The larger diameter of the peripheral openings 358 at the exterior ends 360A allows for entry of larger input fiber optic cables 131 while the narrower center 360B allows for sealing of smaller input fiber optic cables 131. For cables having a diameter that is larger than the diameter of the center portion 360B of the peripheral openings 358, the deformable material of the input fiber insert 344A allows for passage of the cable 131 through the center portion 360B of the peripheral opening 358. As such, the peripheral openings 358 can accommodate input fiber optic cables of various diameters using the same input fiber insert 344A.

The input fiber insert 344A may be any deformable material capable of deforming and providing a seal about the input optical cable 131 and sealing the channel 308C of the cap body 302. Example materials for the input fiber insert 344A include, but are not limited to, rubber, elastomers, silicone, and the like. The size and shape of the input fiber insert 344A corresponds to the corresponding channel 308C (see FIGS. 12 and 13) of the cap body 302. Thus, while the input fiber insert 344A has an oval cross-sectional shape in the embodiment illustrated herein, other shapes and sizes are possible to correspond to channels having different shapes and/or sizes.

Referring momentarily again to FIG. 21, the central opening 356 of the input fiber insert 344A is configured to receive the input fiber compression member 338A. The input fiber compression member 338A is configured as a rod having a bolthead 362 at the input fiber compression plate 342A. The input fiber compression member 338A is positioned through the input fiber compression plate 342A, through the input fiber insert 344A and into the self-clinching nut 326A (see, e.g., FIG. 14) of the base plate 320 such that the threaded end opposite from the bolthead 362 is engaged with the self-clinching nut 326A of the base plate 320. Rotation of the bolthead 352 causes the input fiber compression plate 342A to be drawn closer to the base plate 320, thereby compressing input fiber insert 344A. Compression of the input fiber insert 344A causes the input fiber insert 344A to expand in a direction orthogonal to an axis of the input fiber compression member 338A, which further causes the input fiber insert 344A to close around the input optical cables 131. Expansion of the input fiber gel insert 344A in the direction orthogonal to the axis of the input fiber compression member 338A further causes the input fiber insert 334A to be pressed against the walls of the cap body 302 within channel 308C (see FIG. 12).

Referring once again to FIGS. 14 and 15, the terminal assembly 304 also includes input fiber strain relief members 334A that are coupled to the first base plate section 320A. As described in more detail below, the input fiber strain relief members 334A define an input fiber termination assembly that provides strain relief for the input optical cable 131 by restricting movement of the respective strength members contained in the input optical cable 131.

The example input fiber strain relief members 334A each comprise an input fiber strain relief bracket 364 coupled to the first base plate section 320A, and an input fiber central member 366 at a freestanding end of the input fiber strain relief member 334A. The input fiber strain relief bracket 364 of the illustrated example is configured as an "L" shaped bracket that is coupled to the first base plate section 320A. However, it should be understood that the input fiber strain relief bracket 364 may be configured as a shape other than an "L" shape. As shown in FIGS. 14 and 15, the input fiber strain relief bracket 364 extends from the first base plate section 320A and may each include a clamp 364A. The input fiber strain relief members 334A are otherwise similar to 123A, 123B described above.

Referring again to FIGS. 14 and 15, the output fiber sealing assembly 318 will now be described in greater detail. The output fiber sealing assembly 318 comprises at least one output fiber compression plate 342B, at least one output fiber insert 344B disposed between the output fiber compression plate 342B and the base plate 314, at least one output fiber compression member 338B, and at least one output fiber strain relief member 334B. In the embodiment illustrated in FIGS. 14 and 15, the output fiber sealing assembly 318 includes two input fiber compression plates 342B, two output fiber inserts 344B disposed between the output fiber compression plates 342B and the base plate 314, two output fiber compression members 338B, and two output fiber strain relief members 334B. The output fiber sealing assembly 318 may include more than two of each of the foregoing elements to seal more than two channels 308B (FIG. 12) of the cap body 302. In use, each output fiber insert 344B is disposed within a corresponding output fiber channel 308B of the cap body 302 and between the base plate 314 and a corresponding output fiber compression member 338B. The output fiber compression member 338B passes through the output fiber compression plate 342B, passes through the output fiber insert 344B, and into the self-clinching nut 326B of the base plate 314.

Figure 18:
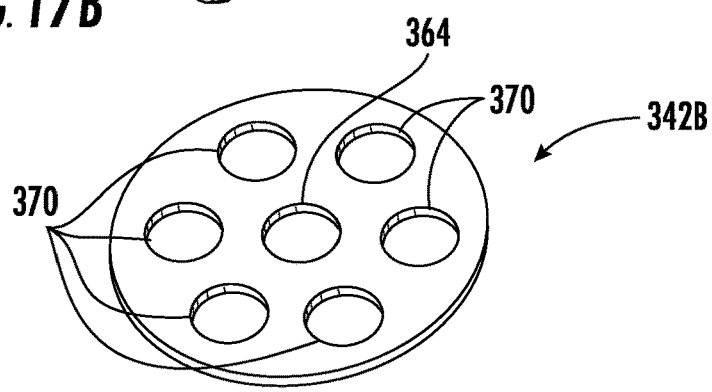
FIG. 18 illustrates an example output fiber compression plate of the terminal assembly depicted in FIGS. 14 and 15 according to one or more embodiments described and illustrated herein.

FIG. 18 illustrates an example output fiber compression plate 342B. The output fiber compression plate 342B comprises a central opening 364 for receiving the output fiber compression member 338B and a plurality of peripheral openings 370 for receiving the output optical fiber cables 133. The peripheral openings 370 define a circle and correspond in location to the peripheral openings 340 (FIG. 16) in the first base plate section 320A. However, it should be understood that embodiments are not limited to the circular configuration and the number of peripheral openings described herein.

Referring again to FIGS. 14 and 15, the output fiber insert 344B is disposed between the base plate 314 and the output fiber compression plate 342B. As will be described in more detail below, the output fiber compression plate 342B compresses the output fiber insert 344B against the base plate 314 to seal the output fiber optic cable 133 when in use.

Figure 20A:
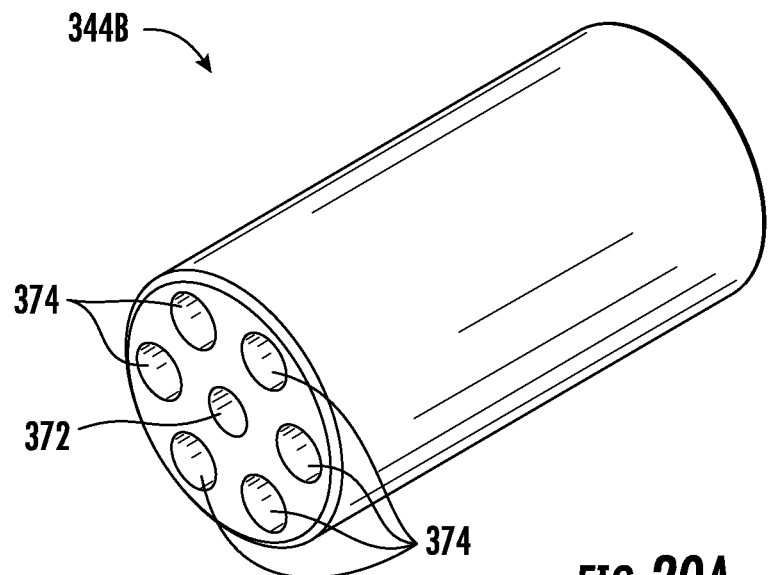
FIG. 20A illustrates a close-up, perspective view of an example input fiber insert of the terminal assembly depicted in FIGS. 14 and 15 according to one or more embodiments described and illustrated herein.
Figure 20B:
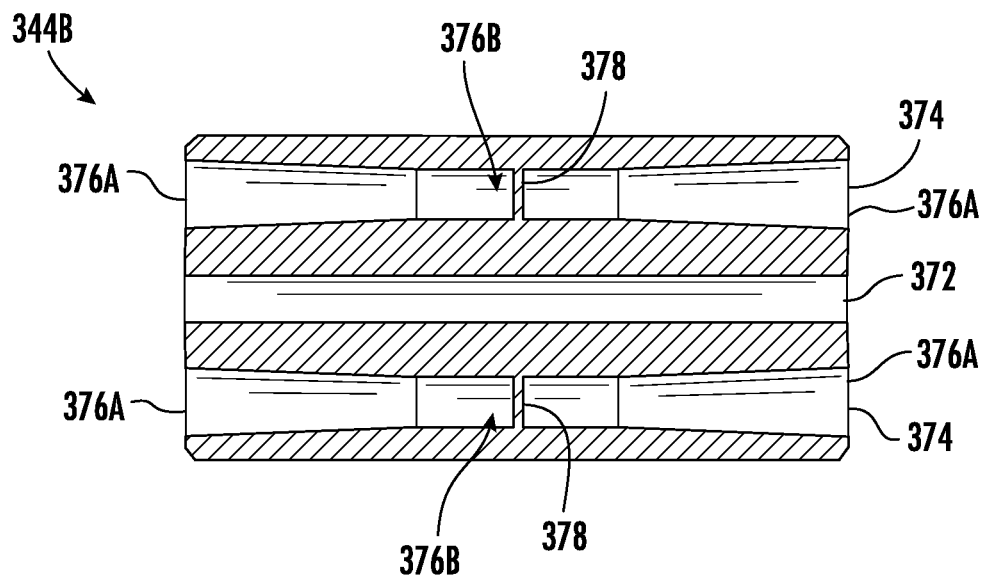
FIG. 20B illustrates a cross-sectional view of the example input fiber insert of FIG. 20A according to one or more embodiments described and illustrated herein.

FIG. 20A illustrates an example embodiment of an output fiber insert 344B and FIG. 20B illustrates a cross-sectional view of the example output fiber insert 344B of FIG. 20A. The output fiber insert 344B includes a central opening 372 for the output fiber compression member 338B (FIG. 21) and peripheral openings 374 for the output optical cables 133. The peripheral openings 374 define a circle and correspond in location to the peripheral openings 340 (FIG. 16) in the first base plate section 320A and the peripheral openings 370 in the output fiber compression plate 342B. It should be understood that embodiments are not limited to the circular configuration and the number of peripheral openings 374 described herein.

The peripheral openings 374 may have a shape that accommodates various sizes of output optical cable 133. For example, referring specifically to FIG. 20B, the diameter of the peripheral openings 374 at the exterior ends 376A may be larger than the diameter at the center portion 376B (i.e., about halfway between the exterior ends 376A) of the peripheral openings 374. The tapered inner surface of the peripheral openings 374 may define a frustro-conical shape wherein the diameter of the peripheral opening 374 decreases towards the center portion 376B. The larger diameter at the exterior ends 376B allows for entry of larger output fiber optic cables 133 while the narrower center portion 376B allows for sealing of smaller output fiber optic cables 133. For output fiber optic cables 133 having a diameter larger than the diameter of the narrower center portion 376B of the peripheral openings 376, the deformable material of the output fiber insert 344B allows for expansion of the narrower center portion 376B of the peripheral opening 374 and passage of the cable through the narrower center portion 376B. As such, the peripheral openings 374 can accommodate output fiber optic cables 133 of various diameters using the same output fiber insert 344B.

The peripheral openings may also include a breakaway wall 378 that seals the peripheral opening 374 when the peripheral opening 374 is not in use and can be broken away by inserting an output fiber optic cable 133 therethrough.

The output fiber insert 344B may be any deformable material capable of deforming and providing a seal about the output optical cables 133 and sealing the channel 308A, 308B (FIG. 12) of the cap body 302. Example materials for the output fiber insert 344B include, but are not limited to, rubber, elastomers, silicone, and the like. The size and shape of the output fiber insert 344B corresponds to the corresponding channel 308A, 308B (FIG. 12) of the cap body 302. Thus, while the output fiber insert 344B has a circular cross-sectional shape in the embodiment illustrated herein, other shapes and sizes are possible to correspond to channels having different shapes and/or sizes.

Referring again to FIG. 21, the central opening 372 of the output fiber insert 344B is configured to receive the output fiber compression member 338B. The output fiber compression member 338B is configured as a rod having a bolthead 362 at the output fiber compression plate 342B. The output fiber compression member 338B is positioned through the output fiber compression plate 342B, through the output fiber insert 344B and into the self-clinching nut 326B (FIG. 16) of the base plate 320 such that the threaded end opposite from the bolthead 362 is engaged with the self-clinching nut 326B. Rotation of the bolthead 362 causes the output fiber compression plate 342B to be drawn closer to the output fiber plate 320, thereby compressing output fiber insert 344B. Compression of the output fiber insert 344B causes the output fiber insert 344B to expand in a direction orthogonal to an axis of the output fiber compression member 338B, which further causes the output fiber insert 344B to close around the output optical cables 133. Expansion of the output fiber insert 344B in the direction orthogonal to the axis of the output fiber compression member 338B further causes the output fiber insert 344B to be pressed against the walls of the cap body 302 (FIG. 12) within the channel 308A. In this manner, the cap body 302 is sealed at the channel 308A and the output optical cables 133.

Referring once again to FIGS. 14 and 15, the example terminal assembly 304 also includes output fiber strain relief assemblies 334B operable to provide strain relief for the output optical cables 133 (FIG. 12). It should be understood that more or fewer output fiber strain relief assemblies 334B may be provided depending on the number of groups of output optical cables 133. In the illustrated example, each of the output fiber strain relief assemblies 334B are aligned with a respective plurality of peripheral openings 340 of the base plate 320. The output fiber strain relief assemblies 334B define an output fiber termination assembly.

FIGS. 22A, 22B and 22C illustrate an example output fiber strain relief member 334B in more detail. The output fiber strain relief member 334B comprising a first end 380 for coupling to the first base plate section 320A and a freestanding second end 382. The output fiber strain relief member 334B includes a ledge 384 at the freestanding second end 382 and a body 386 extending between the first end 380 and the ledge 384. The ledge 384 includes a flange 388 extending from the second end 382 toward the first end 380 of the output fiber strain relief member 334B. A portion of the ledge 384 between the flange 388 and the body 386 is a stopping surface 390 (FIG. 22C) for stopping a strength member 398 of an output fiber cable 133.

In some embodiments, the ledge 388 extends at least partway around the circumference of the body 386. In the embodiment illustrated in FIGS. 22A and 22B, the output fiber strain relief member 334B includes a plurality of ledges 384 at the freestanding second end 382 and each of the ledges 384 corresponds to one of the output optical fiber cables 133. Likewise, the body 386 may include a plurality of sides 392 and each of the plurality of sides 392 may correspond to one of the output optical fiber cables 133.

The output fiber strain relief member 334B of FIGS. 22A, 22B and 22C includes a cap 394 that is coupled to the body 386 of the output fiber strain relief member 334B. The cap 394 may be coupled to the body 386 by way of fastening hardware, such as nuts and bolts, for example, or any other coupling means may be utilized to secure the cap 394 to the body 386. In the embodiment of FIGS. 22A, 22B and 22C, the cap 394 includes the ledges 384 and the flanges 388 discussed above. It should be understood that embodiments are not limited to an output fiber strain relief member 334B that includes a cap 394, and that other configurations are also possible. For example, in some embodiments, the ledge 384 and flanges 388 are integral with the body 386 such that it is a monolithic component.

The output fiber strain relief member 334B may also include a support bracket 396 at the first end 380 for coupling the output fiber strain relief member 334B to the base plate 320. The support bracket 396 includes features such that it may be fastened to the body 386 and the base plate 320, such as holes (not numbered) for mating with fastening means.

As illustrated in FIG. 23 and described in more detail below, the body 386 and the ledge 384 of the output strain relief member 334B cooperate to hold one or more strength members 398 of an output optical cable 133 and to keep the strength members 398 being removed from or proceeding further into the enclosure. FIG. 23, for example, illustrates a strength members 398 of a plurality of output optical cable 133 in position between the flange 388 and the body 386 of the output strain relief member 334B so that an end of the strength member 398 contacts the stopping surface 390 (the stopping surface 390 is illustrated in FIG. 22C for ease of illustration).

Figure 24:
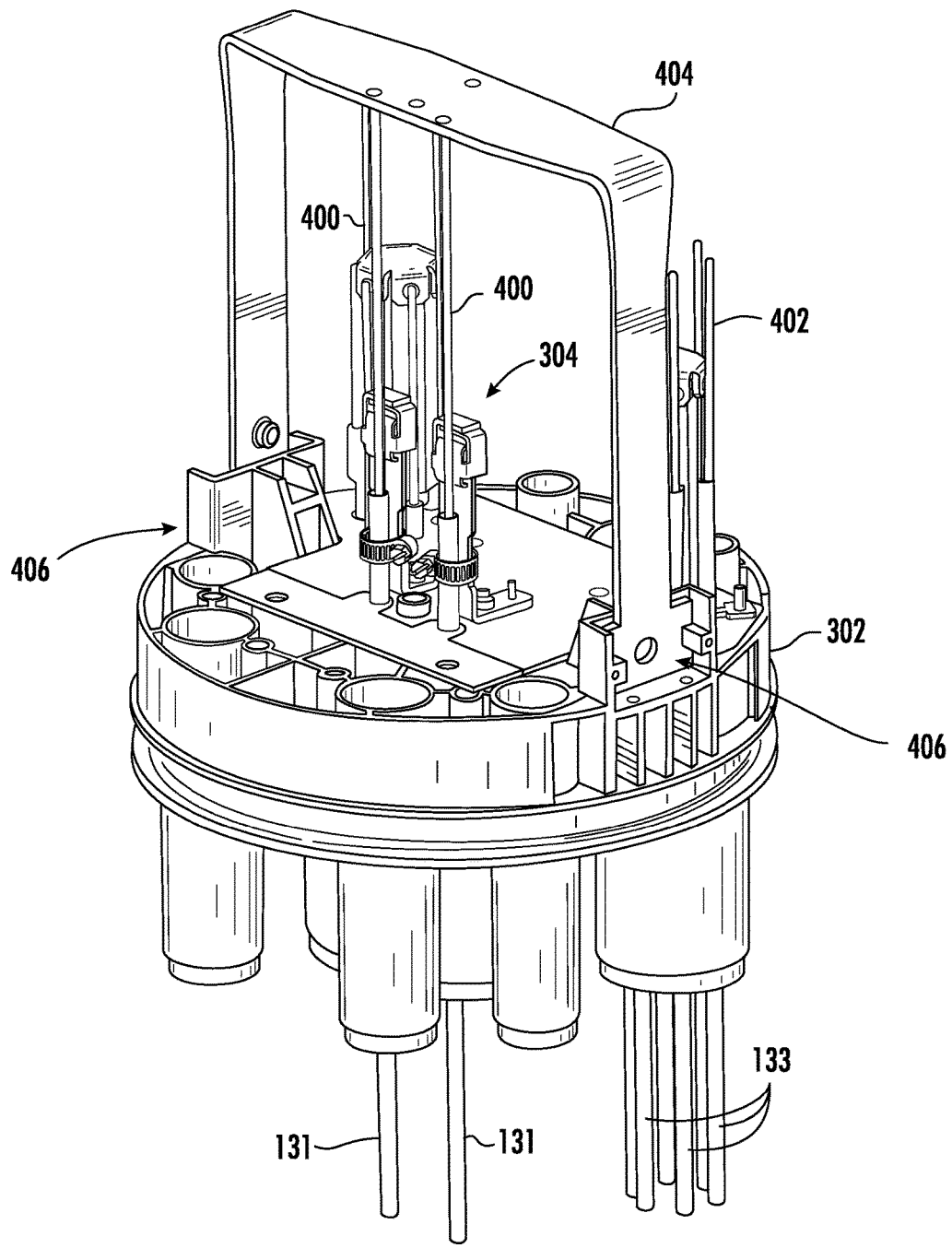
FIG. 24 illustrates an example end cap assembly further comprising a frame coupled to a cap body according to one or more embodiments described and illustrated herein.

Sealing and strain relief of the input and output optical cables 131, 133 will now be described in detail. Referring to FIG. 24, with the terminal assembly 304 coupled to the cap body 302 and the input fiber insert 344A and the output fiber inserts 344B disposed within the respective channels 306C, 308A, 208B as described above, one or more input optical cables 131 are disposed through the input fiber compression plate 342A, the input fiber insert 344A and the base plate 320 and one or more output optical cables 133 are disposed through the output fiber compression plate 342B, the output fiber inserts 344B and the base plate 320.

The jacket of the input optical cable 131 is stripped, thereby exposing pluralities of input optical fibers 400 of the input optical cable 131. As a non-limiting example, the pluralities of input optical fibers 131 may be optically coupled to one or more optical splitter modules, such as the optical splitter modules 406 depicted in FIG. 25, for example. The optical splitter modules 406 may be operable to split an optical fiber signal into two or more optical fiber signals such that the optical signals propagating within the input optical cable 131 may be routed to more than one output optical cable 133 to multiple termination locations (e.g., multiple dwellings or places of business).

The strain relief of the input optical cable 131 is similar to that described above. Thus, referring again to FIG. 6, the jacket of the input optical cable 131 is stripped or otherwise removed to expose the internal input optical fibers 132 as well as one or more strength members 149 configured to provide strength and rigidity to the input optical cable 131. The one or more strength members 149 may be made of any suitable material, such as, without limitation, metal material or Kevlar.

Still referring to FIG. 6, the strength member 149 is positioned between the input fiber strain relief bracket 141 and the central member 143. The strength member 149 may be clamped between the input fiber strain relief bracket 141 and the input fiber input fiber central member 143 by, for example, tightening nut 147 (or other hardware). For example, the input fiber central member 143 may include a post 146 (e.g., a threaded post) that is disposed through a hole of the input fiber strain relief bracket 141. The nut 147 may be tightened to capture the strength member 149 between the input fiber strain relief bracket 141 and the central member 143. Other clamping means may also be provided, such as crimping the input fiber central member 143 using a crimping tool. In this manner, strain relief is provided by the connection of the strength member 149 to the freestanding end of the input fiber strain relief assembly 123. Because the input fiber strain relief assembly 123 has a freestanding end, and is not coupled to any other component of the enclosure (e.g., a frame member 150 (FIG. 9) coupled to the cap body 111), the strength members 149 may be easily connected to the input fiber strain relief assemblies 123 prior to connecting remaining components (e.g., the frame member 150).

The output optical cables 133 pass through peripheral openings 370 (FIG. 18) of the output fiber plate 342B and through the peripheral openings 374 (FIG. 20A) of the output fiber inserts 244B. The output fiber optic cables 133 and their respective output optical fibers 402 also pass through the base plate 302 (FIG. 12) and to an output fiber strain relief member 334B (FIG. 12). The number of output fiber strain relief members 334B may correspond with the number of groups of output optical cables 133.

As shown in FIG. 23, each output optical cable 133 includes a strength member 398. The strength member 398 may be made from any appropriate material, such as metal or Kevlar, for example. As discussed above with reference to FIG. 22C, each strength member 398 may be positioned and clamped between the flanges 388 and the body 386 of the output fiber strain relief members 334B (FIG. 12). Clamping means, such as clamps 364A (FIG. 14) may also be provided to secure the output fiber optical cables 133 to the body 386 of the output fiber strain relief member 334B. Because the output fiber strain relief member 334B has a freestanding end 382 that is not coupled to the frame member 404 (FIGS. 24 and 25) of the enclosure, the strength members 398 may be easily connected to the output fiber strain relief members 334B prior to connecting the cap body 302 to the frame 404 (FIG. 25) or the housing 101.

Either before or after strain relieving the input and output optical cables 131, 133, a seal may be created about the input and output optical cables 131, 133 within the cap body 302 as described above. For example, referring to FIG. 21, the input optical cables 131 are sealed by tightening (i.e., rotating) of the bolthead 362 of the input fiber compression member 338A to draw the input fiber compression plate 342A closer to the base plate 320, thereby compressing the input fiber insert 344A. Similarly, the output optical cables 133 are sealed by tightening (i.e., rotating) of the boltheads 362 of the output compression members 338B to draw the output fiber compression plates 342B closer to the base plate 320, thereby compressing the output fiber inserts 344B.

Figure 25:
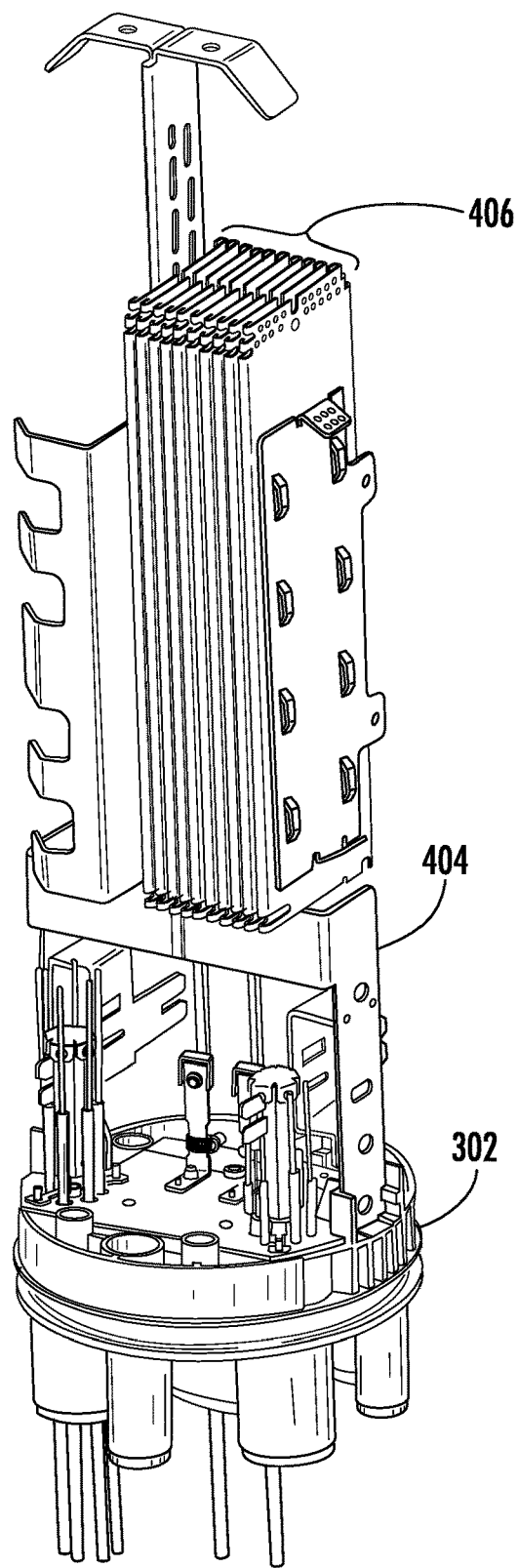
FIG. 25 illustrates an example end cap assembly further comprising a frame and a plurality of optical splitter modules according to one or more embodiments described and illustrated herein.

Referring again to FIG. 24, the fiber optic enclosure 100 may further include a frame member 404 that is coupled to the cap body 302, as at attachment points 406. The frame member 404 may be connected to the cap body 302 by any mechanical fastener, such as a screw, for example. As shown in FIG. 24, the various strain relief assemblies described herein are not directly coupled to the frame member 404. Accordingly, the strain relief of the optical cables may be performed prior to connection of the frame member 404, which provides for a simpler process. The frame member 404 may maintain additional components, such as one or more optical splitter modules 406 as shown in FIG. 25.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An end cap assembly for a fiber optic enclosure, the end cap assembly comprising:
    a cap body comprising an input fiber channel and an output fiber channel, the cap body configured to couple to a housing to enclose components disposed in the housing;
    a base plate coupled to the cap body;
    an input fiber sealing assembly comprising:
        an input fiber insert positioned in the input fiber channel of the cap body;
        an input fiber compression plate positioned in the input fiber channel of the cap body, wherein the input fiber insert is disposed between the input fiber compression plate and the base plate;
        an input fiber compression member, wherein the input fiber compression member passes through the base plate, the input fiber insert and the input fiber compression plate;
        an input fiber strain relief member comprising an input fiber strain relief bracket coupled to the base plate and a central member at a freestanding end of the input fiber strain relief member operable to clamp a strength member of an input optical cable between the central member and the input fiber strain relief bracket; and
    an output fiber sealing assembly comprising:
        an output fiber insert positioned in the output fiber channel of the cap body;
        an output fiber compression plate positioned in the output fiber channel of the cap body, wherein the output fiber insert is disposed between the output fiber compression plate and the base plate;
        an output fiber compression member, wherein the output fiber compression member passes through the base plate, the output fiber insert, and the output fiber compression plate; and
        an output fiber strain relief member comprising a first end coupled to the base plate and a second end spaced from the first end, wherein the second end is a freestanding end.

2. The end cap assembly of claim 1, wherein the base plate comprises a plurality of openings for receiving a plurality of output optical cables that pass through the output fiber insert and the output fiber compression plate.

3. The end cap assembly of claim 2, wherein the plurality of openings are arranged in a circle and the base plate further comprises a threaded opening encircled by the plurality of openings.

4. The end cap assembly of claim 3, wherein the output fiber strain relief member comprises a ledge at the freestanding second end and a body extending between the first end and the freestanding second end.

5. The end cap assembly of claim 4, wherein the ledge comprises a flange and wherein a portion of the ledge between the flange and the body comprises a stopping surface for contacting a strength member of an output fiber cable.

6. The end cap assembly of claim 5, wherein the output fiber strain relief member comprises a cap, and wherein the cap comprises the ledge and a flange extending from the ledge.

7. The end cap assembly of claim 5, wherein the ledge extends at least partway around a circumference of the body.

8. The end cap assembly of claim 5, wherein the body comprises a plurality of sides, wherein each of the plurality of sides corresponds to one of the plurality of openings in the base plate.

9. The end cap assembly of claim 5, wherein the output fiber strain relief member comprises a plurality of the ledges at the freestanding second end, wherein each of the plurality of the ledges corresponds to one of the plurality of openings in the base plate.

10. The end cap assembly of claim 1, wherein the output fiber strain relief member further comprises a support bracket at the first end, wherein the first end is coupled to the base plate by the support bracket.

11. The end cap assembly of claim 1, wherein:
    the input fiber compression member is rotatable to compress the input fiber insert; and
    the output fiber compression member is rotatable to compress the output fiber insert.

12. The end cap assembly of claim 1, wherein the base plate comprises a first base plate section and a second base plate section that cooperate to define at least one input optical cable opening.

13. The end cap assembly of claim 1, wherein the input fiber sealing assembly further comprises an input fiber strain relief member having a first end coupled to the base plate and a second end spaced from the first end.

14. A fiber optic enclosure comprising:
    a cap body comprising:
        a first side and a second side;
        an input fiber channel extending from the first side to the second side; and
        an output fiber channel extending from the first side to the second side;
    a terminal assembly comprising:
        a base plate coupled to the first side of the cap body;
        an input fiber sealing assembly comprising:
            an input fiber insert positioned in the input fiber channel of the cap body;
            an input fiber compression plate positioned in the input fiber channel of the cap body, the input fiber insert located between the input fiber compression plate and the base plate;
            an input fiber compression member, wherein the input fiber compression member passes through the base plate, the input fiber insert, and the input fiber compression plate; and an input fiber strain relief member having a first end coupled to the base plate and a freestanding second end; and an output fiber sealing assembly comprising:
an output fiber insert positioned in the output fiber channel of the cap body;
an output fiber compression plate positioned in the output fiber channel of the cap body, the output fiber insert located between the base plate and the output fiber compression plate;
an output fiber compression member, wherein the output fiber compression member passes through the base plate, the output fiber insert, and the output fiber compression plate; and
an output fiber strain relief member comprising a first end coupled to the base plate and a freestanding second end;
a frame member coupled to the first side of the cap body; and
a housing coupled to the cap body, the housing and the cap body defining an internal volume, the terminal assembly and the frame member in the internal volume.

15. The fiber optic enclosure of claim 14, wherein the input fiber sealing assembly comprises an input fiber strain relief member, and wherein the input fiber strain relief member comprises an input fiber strain relief bracket having a first end coupled to the base plate and a second freestanding end having a central member, the central member operable to clamp a strength member of an input optical cable between the central member and the input fiber strain relief bracket.

16. The fiber optic enclosure of claim 14, wherein the base plate comprises a plurality of openings for receiving a plurality of output optical cables that pass through output fiber insert and the output fiber compression plate.

17. The fiber optic enclosure of claim 16, wherein the plurality of openings are arranged in a circle and the base plate further comprises a threaded opening encircled by the plurality of openings.

18. The fiber optic enclosure of claim 17, wherein the output fiber compression member comprises a threaded surface for engagement with the threaded opening of the base plate.

19. The fiber optic enclosure of claim 14, wherein the output fiber strain relief member comprises a ledge at the freestanding second end and a body extending between the first end and the freestanding second end.

20. The fiber optic enclosure of claim 19, wherein the ledge comprises a flange, wherein a portion of the ledge between the flange and the body comprises a stopping surface for contacting a strength member of an output fiber cable.

21. The fiber optic enclosure of claim 20, wherein the output fiber strain relief member comprises a cap, and wherein the cap comprises the ledge.

22. The fiber optic enclosure of claim 21, wherein the output fiber strain relief member further comprises a support bracket at the first end, wherein the first end is coupled to the base plate by the support bracket.

23. The fiber optic enclosure of claim 14, wherein:
the input fiber compression member is rotatable to compress the input fiber insert; and
the output fiber compression member is rotatable to compress the output fiber insert.

* * * * *